US011087057B1

(12) United States Patent
Giaconi et al.

(10) Patent No.: US 11,087,057 B1
(45) Date of Patent: Aug. 10, 2021

(54) SYSTEM AND METHOD FOR APPLICATION SPECIFIC INTEGRATED CIRCUIT DESIGN RELATED APPLICATION INFORMATION INCLUDING A DOUBLE NATURE ARC ABSTRACTION

(71) Applicant: CHRONOS TECH LLC, San Diego, CA (US)

(72) Inventors: Stefano Giaconi, San Diego, CA (US); Giacomo Rinaldi, San Diego, CA (US); Matheus Trevisan Moreira, San Diego, CA (US); Matthew Pryor, San Diego, CA (US); David Fong, San Diego, CA (US)

(73) Assignee: CHRONOS TECH LLC, San Diego, CA (US)

( * ) Notice: Subject to any disclaimer, the term of this patent is extended or adjusted under 35 U.S.C. 154(b) by 0 days.

(21) Appl. No.: 16/827,256

(22) Filed: Mar. 23, 2020

Related U.S. Application Data

(60) Provisional application No. 62/822,548, filed on Mar. 22, 2019.

(51) Int. Cl.
*G06F 30/31* (2020.01)
*G06F 30/3315* (2020.01)
(Continued)

(52) U.S. Cl.
CPC .......... *G06F 30/31* (2020.01); *G06F 30/3315* (2020.01); *G06F 2111/04* (2020.01); *G06F 2119/12* (2020.01)

(58) Field of Classification Search
CPC ...... G06F 2115/06; G06F 30/30; G06F 30/31; G06F 30/3312; G06F 30/3315;
(Continued)

(56) References Cited

U.S. PATENT DOCUMENTS

| 4,189,625 A | 2/1980 | Strandberg |
| 5,689,644 A | 11/1997 | Chou et al. |

(Continued)

OTHER PUBLICATIONS

Office Action for related U.S. Appl. No. 16/915,598, dated Sep. 18, 2020, in 17 pages.
(Continued)

*Primary Examiner* — Paul Dinh
(74) *Attorney, Agent, or Firm* — Procopio, Cory, Hargreaves & Savitch LLP

(57) ABSTRACT

Systems and methods for application specific integrated circuit design using Chronos Links are disclosed. A Chronos Link is an ASIC on-chip and off-chip interconnect communication protocol that allows interfaces to transmit and receive information. The protocol may utilize messages or signals to indicate the availability and/or readiness of information to be exchanged between a producer and a consumer allowing the communication to be placed on hold and to be resumed seamlessly. A method includes inserting gaskets and channel repeaters connected to interfaces of multiple intellectual property (IP) blocks in order to replace traditional links with Chronos Links; performing simplified floorplanning; performing simplified placement; performing simplified clock tree synthesis (CTS) and routing; and performing simplified timing closure, where timing estimates are based on a double nature arc abstraction.

20 Claims, 15 Drawing Sheets

(51) Int. Cl.
*G06F 111/04* (2020.01)
*G06F 119/12* (2020.01)

(58) Field of Classification Search
CPC ........ G06F 30/34; G06F 30/347; G06F 30/35;
G06F 30/39; G06F 2219/12; G06F
2119/12
USPC .......................................... 716/108, 113, 134
See application file for complete search history.

(56) References Cited

U.S. PATENT DOCUMENTS

| | | | |
|---|---|---|---|
| 6,038,259 A | 3/2000 | Nanya | |
| 6,208,644 B1 | 3/2001 | Pannell et al. | |
| 6,801,329 B1 | 10/2004 | Urabe et al. | |
| 8,365,113 B1 | 1/2013 | Bhardwaj et al. | |
| 9,685,953 B1 | 6/2017 | Sadowski | |
| 9,921,992 B2 | 3/2018 | Hilgemberg Pontes et al. | |
| 9,977,852 B2 | 5/2018 | Giaconi et al. | |
| 9,977,853 B2 | 5/2018 | Giaconi et al. | |
| 10,235,488 B2 | 3/2019 | Giaconi et al. | |
| 10,467,369 B2 | 11/2019 | Giaconi et al. | |
| 10,699,048 B2 | 6/2020 | Giaconi et al. | |
| 2002/0105745 A1 | 8/2002 | Kim | |
| 2003/0035496 A1 | 2/2003 | Noda | |
| 2004/0131062 A1 | 7/2004 | Horie | |
| 2004/0151209 A1 | 8/2004 | Cummings et al. | |
| 2005/0180514 A1 | 8/2005 | Choi et al. | |
| 2005/0200388 A1 | 9/2005 | Har et al. | |
| 2006/0007236 A1 | 1/2006 | Takagi et al. | |
| 2008/0285743 A1 | 11/2008 | Yokota et al. | |
| 2008/0304430 A1 | 12/2008 | Zhuyan | |
| 2009/0106719 A1 | 4/2009 | Stevens | |
| 2009/0268760 A1 | 10/2009 | Smyers | |
| 2009/0285341 A1 | 11/2009 | Pukkila et al. | |
| 2010/0042573 A1 | 2/2010 | Wenig et al. | |
| 2010/0127742 A1 | 5/2010 | Chen | |
| 2010/0205571 A1* | 8/2010 | Manohar | G06F 30/35 716/103 |
| 2010/0285743 A1 | 11/2010 | Li et al. | |
| 2011/0058569 A1 | 3/2011 | Harrand | |
| 2013/0259146 A1 | 10/2013 | Mangano et al. | |
| 2014/0064096 A1 | 3/2014 | Stevens et al. | |
| 2014/0204764 A1 | 7/2014 | Kumar | |
| 2014/0240326 A1 | 8/2014 | Cutter et al. | |
| 2014/0376557 A1 | 12/2014 | Park et al. | |
| 2015/0120978 A1 | 4/2015 | Kalyanasundharam et al. | |
| 2015/0121324 A1 | 4/2015 | Thonnart et al. | |
| 2016/0006658 A1 | 1/2016 | Averi et al. | |
| 2016/0034409 A1 | 2/2016 | Kim et al. | |
| 2016/0188522 A1 | 6/2016 | Hilgemberg Pontes et al. | |
| 2016/0344629 A1 | 11/2016 | Gray | |
| 2017/0091130 A1 | 3/2017 | Matsunaga | |
| 2017/0126425 A1 | 5/2017 | Giaconi et al. | |
| 2017/0180800 A1 | 6/2017 | Mayrand | |
| 2017/0289057 A1 | 10/2017 | Jiang et al. | |
| 2017/0293586 A1 | 10/2017 | Yan et al. | |
| 2017/0308721 A1 | 10/2017 | Pedersen | |
| 2018/0097720 A1 | 4/2018 | Jaffer et al. | |
| 2018/0109415 A1 | 4/2018 | Han et al. | |
| 2018/0227015 A1 | 8/2018 | McCormack et al. | |
| 2019/0213296 A1 | 7/2019 | Lin et al. | |

OTHER PUBLICATIONS

Non-Final Office Action dated Feb. 3, 2021 in related U.S. Appl. No. 16/673,647 (32 pages).

Ex parte Quayle Office Action dated May 6, 2021 in related U.S. Appl. No. 16/673,647 (4 pages).

* cited by examiner

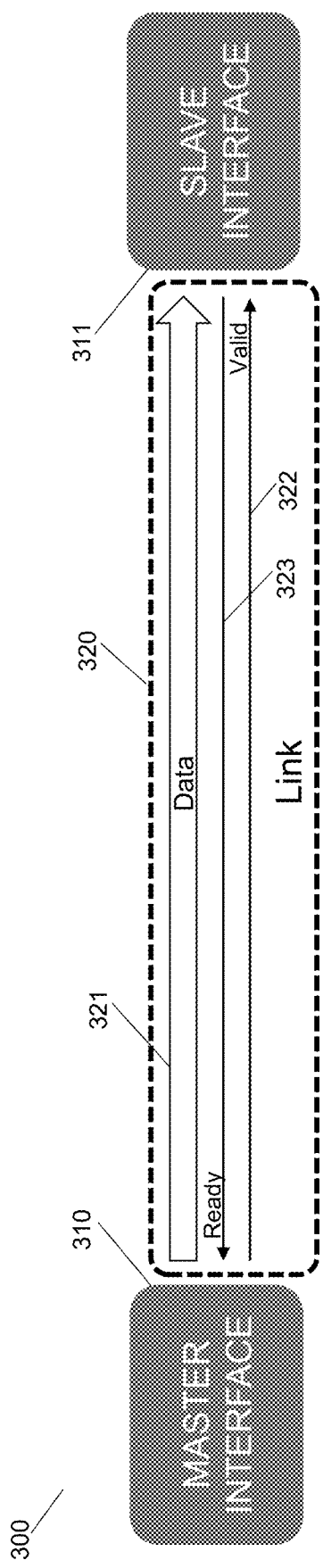
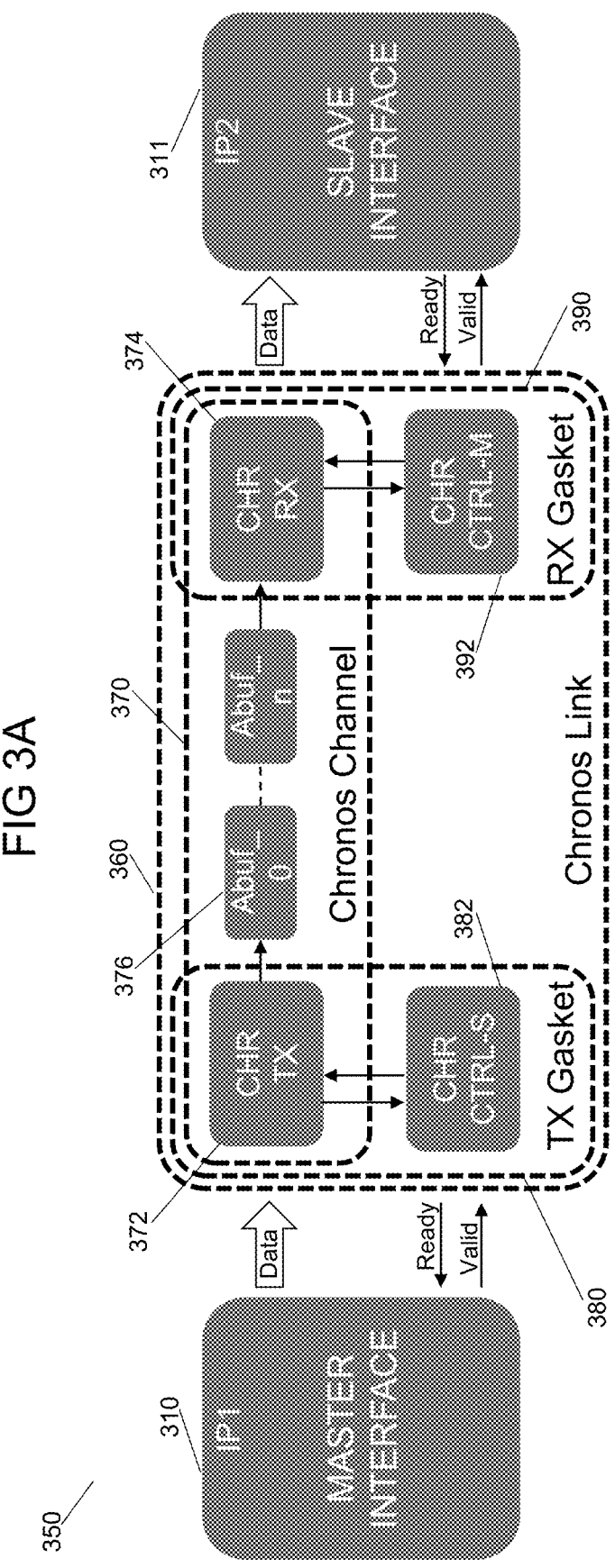
FIG 3A
FIG 3B

SYSTEM AND METHOD FOR APPLICATION SPECIFIC INTEGRATED CIRCUIT DESIGN RELATED APPLICATION INFORMATION INCLUDING A DOUBLE NATURE ARC ABSTRACTION

RELATED APPLICATIONS INFORMATION

This application claims benefit of priority under 35 U.S.C. 119(e) to U.S. Provisional Patent Application No. 62/822,548 filed on Mar. 22, 2019 entitled "SYSTEM AND METHOD FOR APPLICATION SPECIFIC INTEGRATED CIRCUIT DESIGN RELATED APPLICATION INFORMATION INCLUDING A DOUBLE NATURE ARC ABSTRACTION," the disclosure of which is incorporated herein by reference in its entirety.

This application is also related to U.S. patent application Ser. No. 15/644,696 titled: "RTL2CHR: AN ASIC DESIGN METHODOLOGY FOR CONVERTING RTL HDL TO CHRONOS LIGHT FAST NETLISTS"; U.S. patent application Ser. No. 15/053,486 titled: "SYSTEM AND METHODS FOR MEASURING PERFORMANCE OF AN APPLICATION SPECIFIC INTEGRATED CIRCUIT INTERCONNECT"; U.S. patent application Ser. No. 15/645,917 titled: "SYSTEMS AND METHODS FOR THE DESIGN AND IMPLEMENTATION OF AN INPUT AND OUTPUT PORTS FOR CIRCUIT DESIGN"; and Published U.S. patent application Ser. No. 15/344,441 titled: "SYSTEM AND METHOD FOR APPLICATION SPECIFIC INTEGRATED CIRCUIT DESIGN"; and published U.S. patent application Ser. No. 15/344,420 titled: "APPLICATION SPECIFIC INTEGRATED CIRCUIT LINK"; and Published U.S. patent application Ser. No. 15/344,416 titled: "APPLICATION SPECIFIC INTEGRATED CIRCUIT INTERCONNECT". All of the above are incorporated herein in their entirety as if set forth in full.

BACKGROUND

1. Technical Field

The various embodiments described herein are related to application specific integrated circuits (ASICs), and more particularly to the design of various ASICs.

2. Related Art

Continuing advances in semiconductor device fabrication technology have yielded a steady decline in the size of process nodes. For example, 22 nanometer (nm) process nodes were introduced in 2012 but were quickly succeeded by 14 nm fin field-effect transistors (FinFETs) in 2014 while 5 nm process nodes are projected for 2020.

The decrease in process node size allows a growing number of intellectual property (IP) cores or IP blocks to be placed on a single ASIC chip. That is, modern ASIC designs often spread numerous process nodes across a comparatively large silicon die, and include combinations of IP blocks and logic functions. At the same time, modern technology also requires increased connectivity and large data transfers between various IP blocks. In addition, modern ASIC chips frequently include multiple clock domains in order to leverage multi-core implementations. Thus, one or more clock signals may need to be distributed across the chip in a manner that minimizes clock skew. For instance, the edge of the clock signal received at a logic block located near a clock source should be aligned with those received at more distant logic blocks.

Conventionally, a balanced clock signal distribution (i.e., timing closure) is achieved by inserting buffers. For example, pursuant to a traditional ASIC design flow, after floor planning and placing various IP blocks, a clock tree (i.e., a clock distribution network) may be synthesized and buffers may be added along the signal path from a clock source to various IP blocks according to the clock tree. In fact, timing closure for a clock signal that is distributed over a large and complex ASIC design typically requires the strategic placement of numerous buffers. Moreover, the distribution of a clock signal is also highly susceptible to both systematic and random variations. In particular, proper timing closure must account for the effects of on-chip variations that arise as a result of different process, voltage, and temperature (PVTs) and operation modes, which would otherwise introduce additional clock skews. As such, the most laborious and time consuming aspects of conventional ASIC design tends to be clock alignment and timing closure. Clock tree synthesis and timing closure generally require significant manual intervention. In addition, the mechanisms (i.e., buffers) used to balance the clock across an ASIC chip generally consume a majority of the power in any conventional ASIC design.

Therefore, what is needed are an apparatus and method that overcome these significant problems found in the aforementioned conventional approach to ASIC design.

SUMMARY

Apparatuses and methods for ASIC design are provided. According to various aspects, systems and methods for application specific integrated circuit design using Chronos Links are described. A Chronos Link is an ASIC on-chip and off-chip interconnect communication protocol that allows interfaces to transmit and receive information. The protocol may utilize messages or signals to indicate the availability and/or readiness of information to be exchanged between a producer and a consumer allowing the communication to be placed on hold and to be resumed seamlessly. A method includes inserting gaskets and channel repeaters connected to interfaces of multiple intellectual property (IP) blocks in order to replace traditional links with Chronos Links; performing simplified floorplanning; performing simplified placement; performing simplified clock tree synthesis (CTS) and routing; and performing simplified timing closure, where timing estimates are based on a double nature arc abstraction.

In an example aspect a method of designing communication interfaces between multiple components of an ASIC chip is provided. The method includes identifying, with a processor, interfaces and communication protocols used between pairs of components of the multiple components of the ASIC chip and determining, with the processor, timing estimates between the pairs of components of the multiple components of the ASIC chip based on a double nature arc abstraction of interfaces the multiple components. The method also includes, based on the identified communication protocols and the determined timing estimates between the pairs of components of the multiple components of the ASIC chip, configuring, with the processor, gaskets to insert into the interfaces of the multiple components of the ASIC chip, the gaskets configured to provide control of timing requirements of a communications link between the pairs of components of the multiple components of the ASIC chip. The designed communication interfaces are usable in fabrication of the ASIC chip.

In another example aspect, a system for designing communication interfaces between multiple components of an ASIC chip is provided. The system includes a processor and a computer readable medium coupled to the processor. The computer readable medium comprising instructions for causing the processor to identify interfaces and communication protocols used between pairs of components of the multiple components of the ASIC chip and determine timing estimates between the pairs of components of the multiple components of the ASIC chip based on a double nature arc abstraction of interfaces the multiple components. The process is further configured to, based on the identified communication protocols and the determined timing estimates between the pairs of components of the multiple components of the ASIC chip, configure gaskets to insert into the interfaces of the multiple components of the ASIC chip, the gaskets configured to provide control of timing requirements of a communications link between the pairs of components of the multiple components of the ASIC chip. Wherein the designed communication interfaces are usable in fabrication of the ASIC chip.

Other features and advantages of the present inventive concept should be apparent from the following description which illustrates by way of example aspects of the present inventive concept.

BRIEF DESCRIPTION OF THE DRAWINGS

The above and other aspects and features of the present inventive concept will be more apparent by describing example embodiments with reference to the accompanying drawings, in which:

FIG. 3A is a block diagram illustrating an exemplary point-to-point connection according to various embodiments;

FIG. 3B is a block diagram illustrating an exemplary point-to-point connection implemented with a Chronos Link according to various embodiments;

DETAILED DESCRIPTION

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

Figure 1:
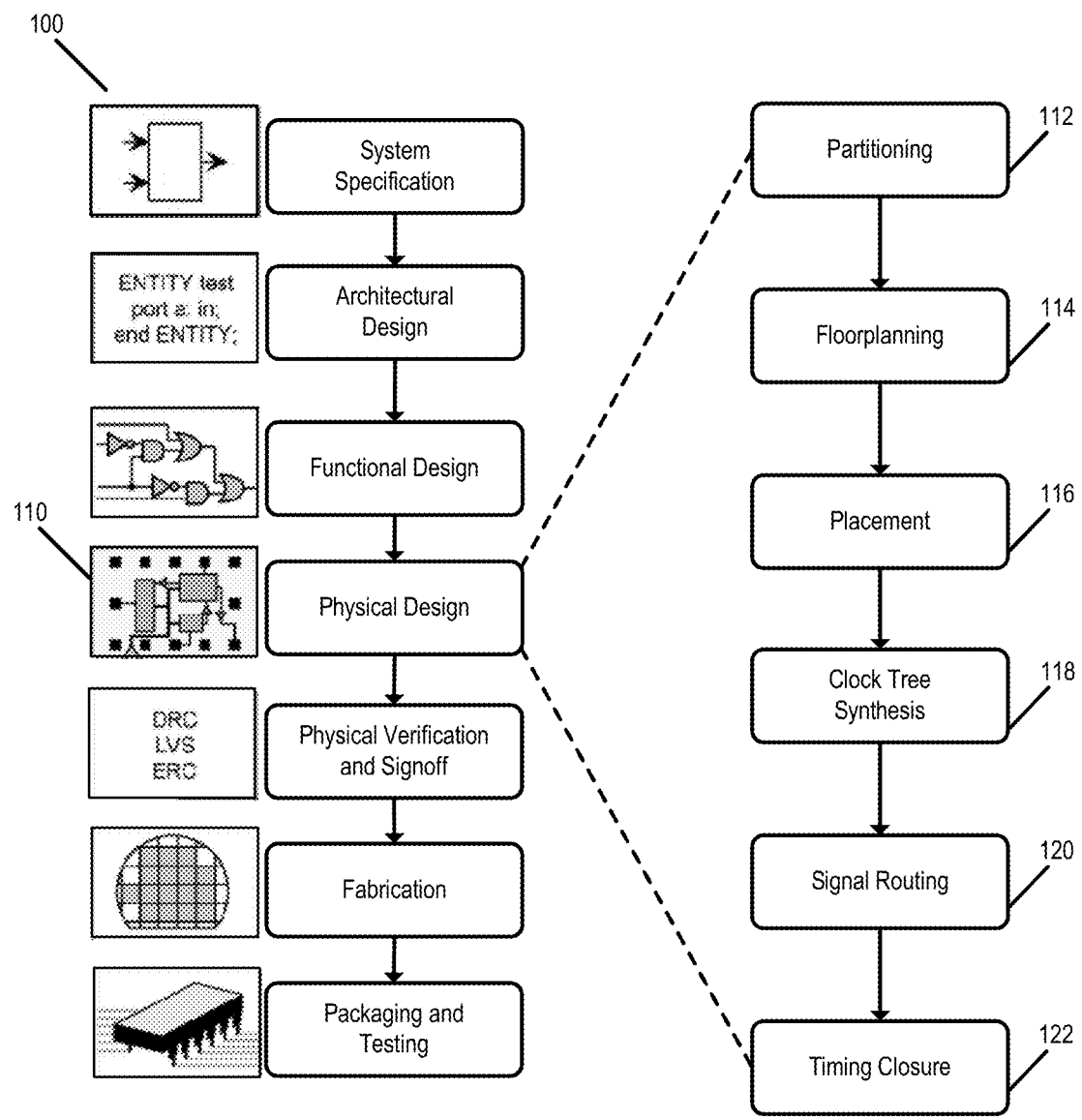
FIG. 1 is a flowchart illustrating a conventional ASIC design flow according to various embodiments.

FIG. 1 is a flowchart illustrating a conventional ASIC design flow (100). The conventional ASIC design flow (100) includes a physical design step (110). The physical design step (110) may include partitioning (112), floorplanning (114), placement (116), clock tree synthesis (118), signal routing (120), and timing closure (122).

Clock tree synthesis (118) may include balancing a clock such as by inserting buffers in various connections in order to minimize clock skew across an ASIC design. Signal routing (120) may include routing a data path from each Intellectual Property (IP) block in the ASIC design, routing one or more clock signals, and routing any remaining signals. Timing closure (122) may include evaluating timing margins across various PVTs and various operating modes.

Figure 2:
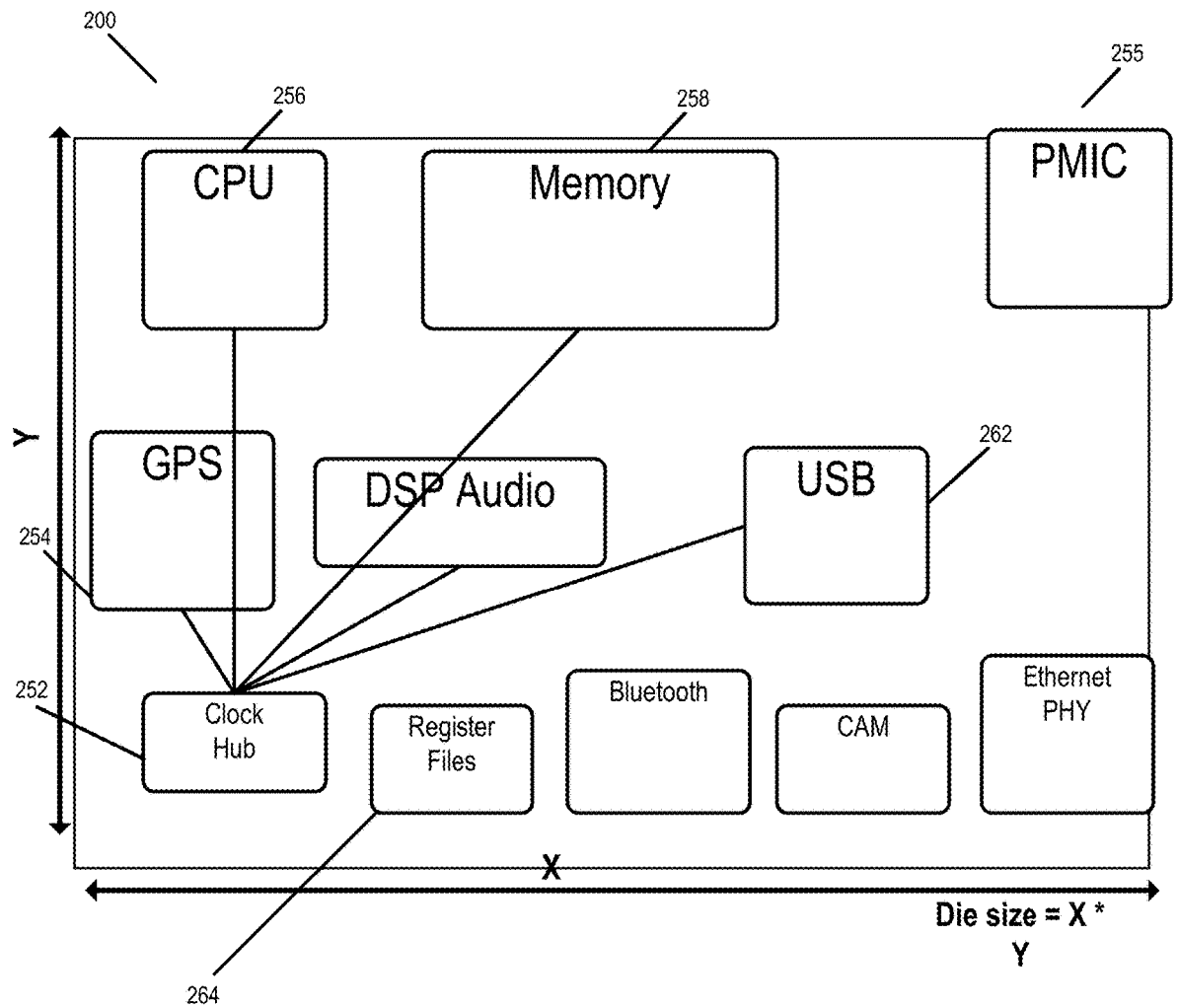
FIG. 2 illustrates an exemplary floorplan of an ASIC design according to various embodiments.

FIG. 2 illustrates a floorplan of an ASIC design (200). The ASIC design (200) may be fabricated on a die (255) (i.e., semiconductor material) having dimensions of "x" and "y" and an area of (x×y). The ASIC design (200) may include a clock hub (252). By applying clock tree synthesis as required in a conventional ASIC design flow (e.g., conventional ASIC design flow 100), a clock signal from the clock hub (252) may be distributed to various IP blocks including, for example, but not limited to, a global positioning system (GPS) block (254), a central processing unit (CPU) (256), a memory block (258), a digital signal processing (DSP) audio block (260), a universal serial bus (USB) (262), and register files (264). Moreover, a multitude of buffers (not shown) may be inserted along the clock path from the clock hub (252) to each of the IP blocks. The ASIC design 200 may also include a Bluetooth module (266), a camera (268) and an Ethernet module (270).

An interface is defined as a set of IP ports that follow a specific protocol in order to exchange data or control information with other interfaces that comply with the same protocol. A link is defined as a set of signals connecting two or more interfaces. Links may be composed of data signals, control signals, and/or a combination of both. Only interfaces that follow the same protocol can be connected together. In one embodiment, FIG. 3A illustrates a block diagram illustrating a point-to-point connection 300. The point-to-point connection 300 includes a link (322) between a Master interface (310) and a Slave interface (311). In the diagram of FIG. 3A, the Master interface (310) transfers data to the Slave interface (311). A flow of data (321) is governed by a protocol implemented with two control signals (322 and 323) including a ready signal sent by the Slave interface 311 to indicate that the Slave interface 311 is ready to receive data from the link, and a valid indicator sent by the Master interface 310 indicating that it has new data to inject into the link. FIG. 3B illustrates a block diagram illustrating a point-to-point connection. The point-to-point connection 350 uses an implementation of a Chronos Link (360) to perform the same data exchange between Master interface (310) and Slave interface (311).

A Chronos Link is an ASIC on-chip and off-chip interconnect communication protocol that allows interfaces to transmit and receive information. The protocol may utilize messages or signals to indicate the availability and/or readiness of information to be exchanged between a producer and a consumer allowing the communication to be placed on hold and to be resumed seamlessly. The Chronos Link (360) is unique by relying on a reduced set of timing assumptions and in its robustness against delay variations, except for those belonging to a few specific forking logic paths called isochronic forks. To do so, the Chronos Link (360) transmits data using delay insensitive (DI) codes and quasi-delay-insensitive (QDI) logic, making the communication insensitive to all wire and gate delay variations. Also, a unique characteristic of a Chronos Link, when compared to related solutions, is the fact that it uses temporal compression in its internal paths to reduce the overheads of QDI logic and efficiently transmit data. In fact, data can be compressed by different ratios, which can be any rational number (as long as a technology specific maximum frequency restriction is respected). The Chronos Link (360) protocol provides an agnostic capability that allows for direct replacement of many commonly used ASIC communication protocol such as AMBA AXI, CoreConnect, IPBus, OCP, Hyper Transport, Quick Path, etc. or can be tailored to a fully custom implementation. The Chronos Link (360) is disclosed in U.S. Pat. No. 9,977,853 (the '853 patent), the disclosure of which is incorporated herein by reference in its entirety as if set forth in full.

In one embodiment the Chronos Link (360) is composed of a Chronos Channel (370) disclosed in U.S. Pat. No. 9,977,852 (the '852 patent), the disclosure of which is incorporated herein by reference in its entirety as if set forth in full, plus a Chronos Slave Controller (382), communicating directly to the original Master interface (310) and a Chronos Master Controller (392) to connect to the original Slave interface (311). The Chronos Link (360), Master Controller (392) and Slave Controller (382) are disclosed in the '853 patent. The Chronos Link (360) brings all the advantages of a Chronos Channels to a communication protocol, allowing independent clock references for Master and Slave IPs, PVT tolerance, simplified floorplan, enhanced yield, and data time compression (with potential for reduced routing).

A Chronos Channel is defined by the combination of a DI code (and related handshake protocol), a temporal compression ratio and the hardware required to encode, decode, compress, decompress and transmit data.

DI codes are a specific family of encoding schemes where no codeword can be contained in another codeword. This allows a receiver to perceive the transmission of a codeword unambiguously. Such a characteristic eliminates the need for a control signal that identifies the validity of a data channel, and its respective timing assumptions (as in synchronous or bundled-data asynchronous design), as the validity of the data channel is encoded in the data itself. Also, note that usually DI codes are employed in digital applications, which means that their code words are typically defined using a set of binary values. However, in a Chronos Channel, signals do not need to be digital and codewords can be represented using sets with more than 2 values, provided that data is still encoded using a DI code. In other words, the data in a Chronos Chanel can be composed of analog signals, as long as no codeword is contained in another codeword. Such a characteristic allows a more flexible usage of Chronos Channels. Another aspect of DI codes is that, to allow data transmission, they are usually coupled to a handshake protocol, which is usually 4- or 2-phases.

Referring to FIG. 3B, in various embodiments, a Chronos Channel (370) may include a transmitter (372) (i.e. a synchronous to asynchronous converter) and a receiver (374) (i.e. an asynchronous to synchronous converter). In various embodiments, data signals from the Master interface (310) and a clock signal (not shown) may enter the transmitter (372). The output (i.e., asynchronous data) from the transmitter (372) may travel through a timing independent channel composed of a "n"-number of asynchronous buffer (ABUF) repeaters (376). The asynchronous data from the transmitter (372) is then input into the receiver (374) that is associated with the Slave interface (311). The output of the receiver (374) includes data that is input into the Slave interface (311). Advantageously, the timing independent channel composed of the ABUF repeater (376) is self-regulating and process independent. As such, in various embodiments, the timing independent channel between the transmitter (372) and the receiver (374) may be established by a handshake procedure without any need to perform complex timing closure.

In some embodiments, the timing independent channel between the transmitter (372) and the receiver (374) may include one or more repeaters (376) (e.g., ABUF repeaters). The repeaters (376) may improve signal strength and throughput in the asynchronous channel between the transmitter (372) and the receiver (374). Alternately, the transmitter (372) and the receiver (374) may have a direct connection, i.e., without any ABUF repeaters (376).

A gasket comprises all Chronos Link infrastructure required to transmit or receive information that is directly attached to an interface. In a possible embodiment, a transmitter gasket (380) is composed of a transmitter (372) and a Chronos Slave Controller (382). In various embodiments, a receiver gasket (390) comprises the receiver (374) and a Chronos Master Controller (392).

Figure 4:
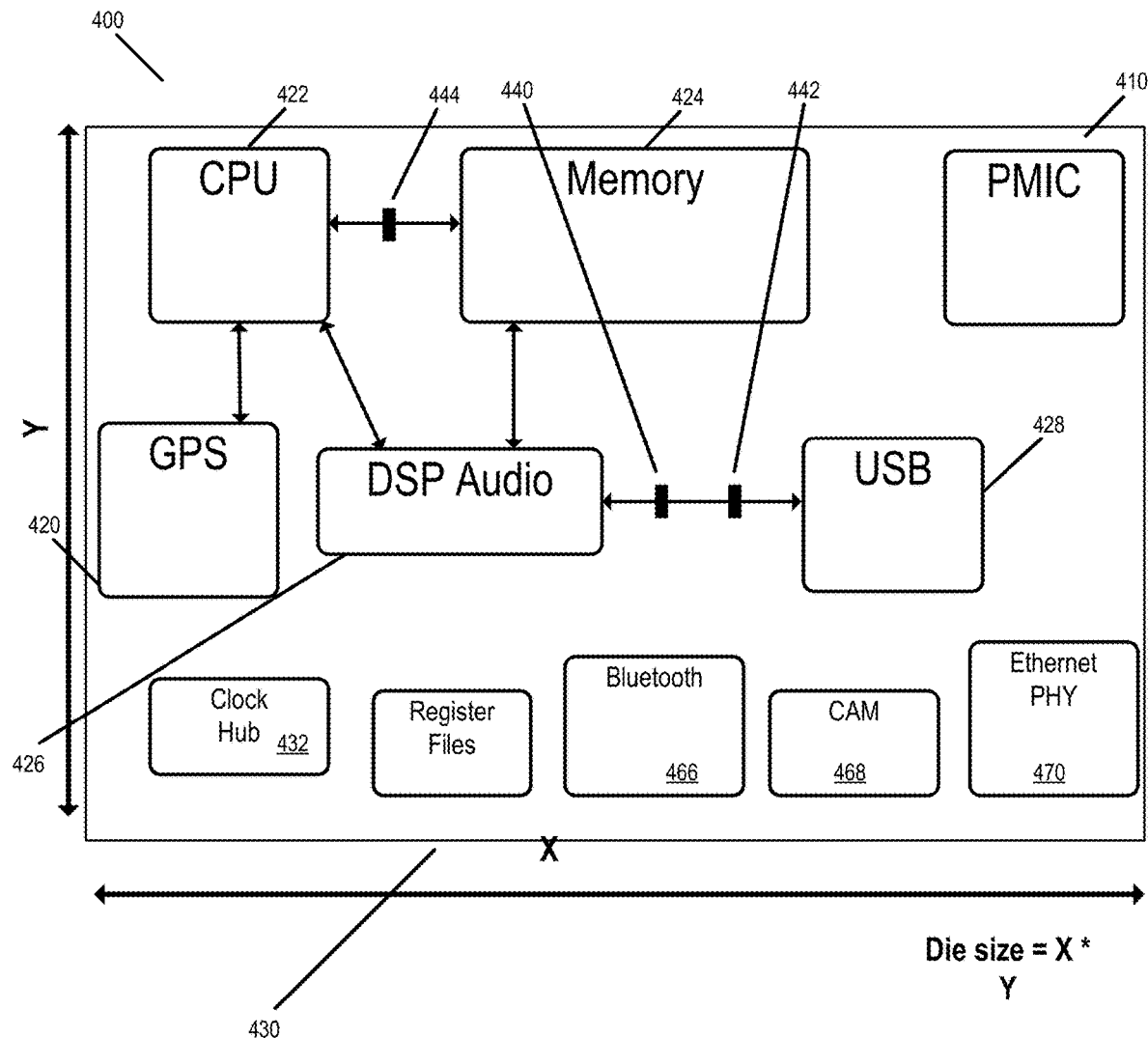
FIG. 4 illustrates an exemplary floorplan of an ASIC design with Chronos Channels according to various embodiments.

FIG. 4 illustrates a floorplan of an ASIC design (400) according to various embodiments. Referring to FIG. 4, in various embodiments, the ASIC design (400) may be fabricated on a die (410) (i.e., semiconductor material) having dimensions of "x" and "y" and an area of (x×y). The ASIC design (400) may include various IP blocks including, for example, but not limited to, a GPS block (420), a CPU (422), a memory block (424), a DSP audio block (426), a USB (428), and register files (430). In various embodiments, the ASIC design (400) includes transmitter and receiver gaskets (shown as border around each IP block). A gasket may not be needed for clock hub (432). For example, data from an IP block is output via a transmitter gasket while data destined for an IP block is input via a receiver gasket. The ASIC design (400) may also include a Bluetooth module 466, a camera 468 and an Ethernet module 470

In various embodiments, gaskets around different IP blocks allow timing independent channels to be established between IP blocks in the ASIC design (400). For example, a first timing independent channel may be established between the GPS block (420) and the CPU (422) using one or more transmitter gaskets and receiver gaskets. In various embodiments, the first timing independent channel may be a part of a point-to-point connection (e.g., the point-to-point connection (200) of FIG. 2) between the GPS block (420) and the CPU (422). A second timing independent channel may be established between the DSP audio block (426) and the CPU (422), the memory block (424), the USB (428), and the register files (430) using one or more transmitter gaskets and receiver gaskets. In various embodiments, the second timing independent channel may be a part of a point-to-multi-point connection between the DSP audio block (426) and the CPU (422), the memory block (424), the USB (428), and the register files (430). In addition, a third timing independent channel may be established between the CPU (422) and the GPS block (420), the DSP audio block (426), and the memory block (424).

According to one exemplary embodiment, timing closure for the ASIC design (400) may be accomplished with simplified top level closure. That is, analyzing and closing timing for each individual IP block in the ASIC design (400) across all corners (i.e., PVT corners) obviates most timing margin evaluation for the ASIC design (400) as a whole. Since synchronous paths may be contained within an IP block in ASIC design (400), chip yields may improve and timing closure margins may be relaxed. In various embodiments, a timing independent channel between two or more IP blocks may include one or more channel repeaters, which can improve signal strength and throughput. In various embodiments, repeaters may be inserted on the basis of distance or other design characteristics between IP blocks. For example, the second timing independent channel between the DSP audio block (426) and the USB (428) may include a first repeater (440) and a second repeater (442). The third timing independent channel between the CPU (422) and the memory block (424) may include a third repeater (444).

Advantageously, the transmitting and receiving gaskets included in the ASIC design (400) renders the top level ASIC design (400) insensitive to PVT variations and resilient to device aging. Due to the reduction of the clock network, the ASIC design (400) also consumes less power. Consequently, the ASIC design (400) may be especially ideal for large area ASICs where routing (i.e., of the clock signal) is difficult and significant effort is traditionally expended in synthesizing a clock tree to balance the skew across die, process corners, and modes of operation. Additionally, as a result of the self-timed nature and encoding of the channel an electromagnetic interference (EMI) profile is altered in a way that helps mask detection of activity patterns. This enhances the security of the device, since these techniques can be used to decipher circuit functionality and other design characteristics.

Figure 5:
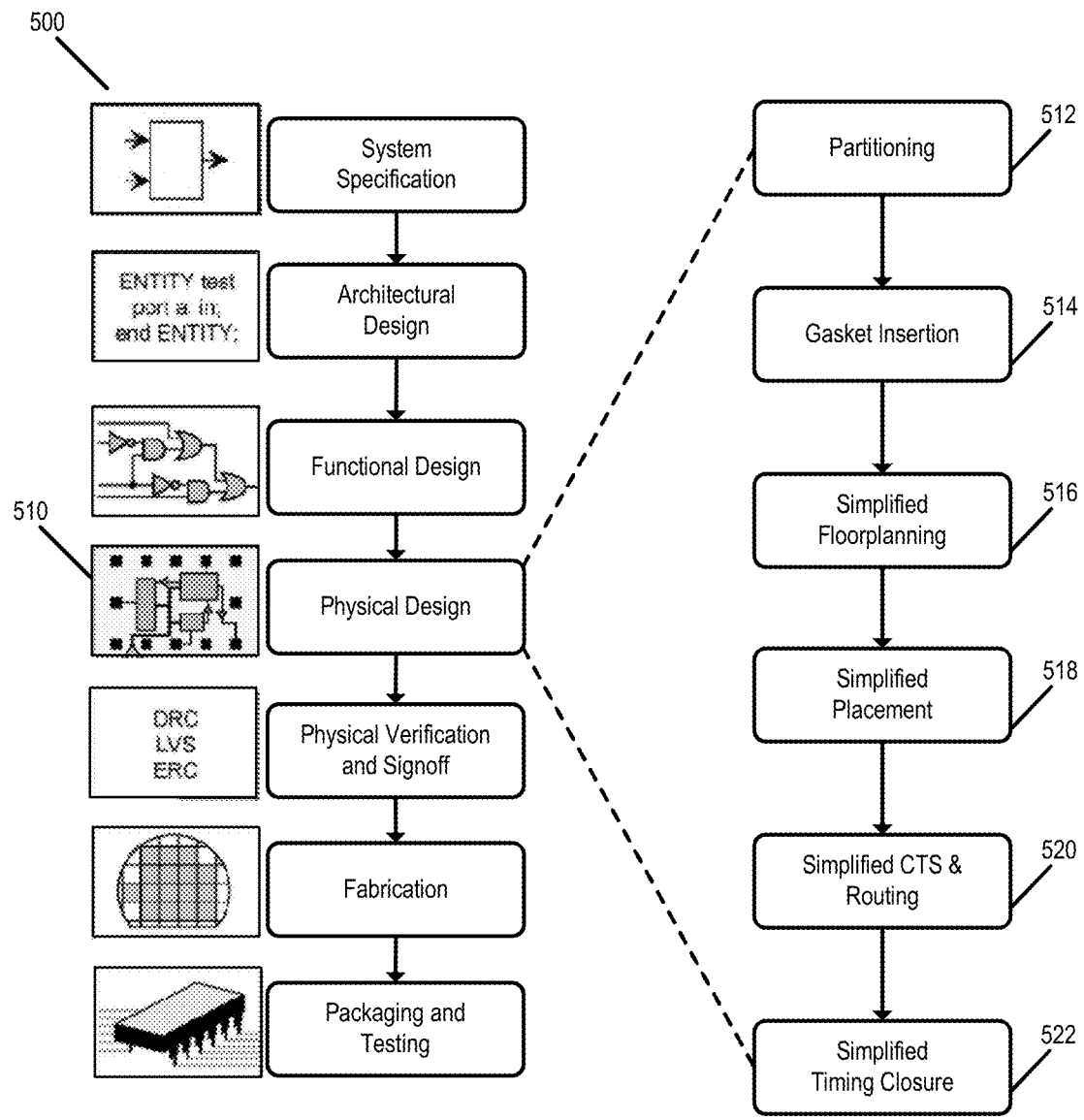
FIG. 5 is a flowchart illustrating an exemplary process for Chronos ASIC design according to various embodiments.

FIG. 5 depicts a flowchart (500) illustrating a Chronos ASIC design flow 500 according to various embodiments, which may be used to implement an ASIC design (400). In various embodiments, the Chronos ASIC design flow (500) includes a physical design step (510). In several embodiments, the physical design step (510) may include partitioning (512), gasket insertion (514), simplified floorplanning (516), simplified placement (518), simplified clock tree synthesis (CTS) and routing (520), and simplified timing closure (522).

In various embodiments, the gasket insertion (514) step is unique to the Chronos ASIC design flow (500) and, thus, is not performed on the standard ASIC design flow (100). In some embodiments, the gasket insertion (514) comprises, among other tasks, insertion of transmitter gaskets (380) and receiver gaskets (390) on each interface of each IP block of the design. The gasket insertion flow is further detailed by a flowchart (600) in FIG. 6.

In various embodiments, simplified floorplanning (516) replaces conventional floorplanning. Due to the simplified CTS and routing, simplified timing closure, and other effects of inserting Chronos Links, the IP blocks in top level may have more flexibility to relocate on die.

In various embodiments, simplified placement (518) replaces conventional placement. Synchronous logic timing paths may be contained to the internal IP core due to gasket insertion at the IP boundary. As a result, the logic previously connected to IP ports now has more flexibility to place within the IP core to simplify timing closure and may result in improved area, power or other design metrics.

In various embodiments, simplified CTS and routing (520) replaces conventional CTS (118) and conventional routing (120). As a result of the Chronos Channel timing independence, IP blocks within the top level may not be subjected to inter-block clock skew balancing requirements. Additionally, inter-block connections replaced with a Chronos Channel eliminate the synchronous timing closure requirement. This timing closure may have involved inserting clocked flip-flops or latches, including related clock distribution and balancing requirements. In various embodiments, simplified CTS with a Chronos Channel may have reduced clock balancing requirements or reduced number of clock sinks. This may result in lower clock insertion delays or lower power. The Chronos Channel connections may require fewer wires resulting in simplified routing and reduced routing congestion. As a result of the reduced routing, and possibly other effects of adding a Chronos Link, a reduction in chip capacitance may also be achieved.

In various embodiments, simplified timing closure (522) replaces conventional timing closure (122). The use of Chronos Channels obviates a substantial need to evaluate timing margins across PVT corners. The asynchronous protocol may be resilient to most PVT variations and other variations. As a result, synchronous timing closure across corners may be limited to the IP block level. Timing margins may be reduced as a result of the Chronos Channel. A reduction in hold buffering may be achieved, or reduction in setup path requirement may be achieved, with a Chronos Channel. In various embodiments, the simplified timing closure (522) includes timing analysis of a small subset of slow corners and optimization of the Chronos Channel.

In various embodiments, each IP block may be associated with a Liberty file (i.e., lib) describing the timing and power parameters for the block in a particular technology across a range of operation modes. Moreover, each IP block may also be associated with an abstract view, which may contain the IP physical boundary as well as the location of each pin. A top level netlist may describe the connection between different IP blocks. In addition, information on different clock domains may also be available. The foregoing information may serve as inputs into a gasket generation process.

Figure 6:
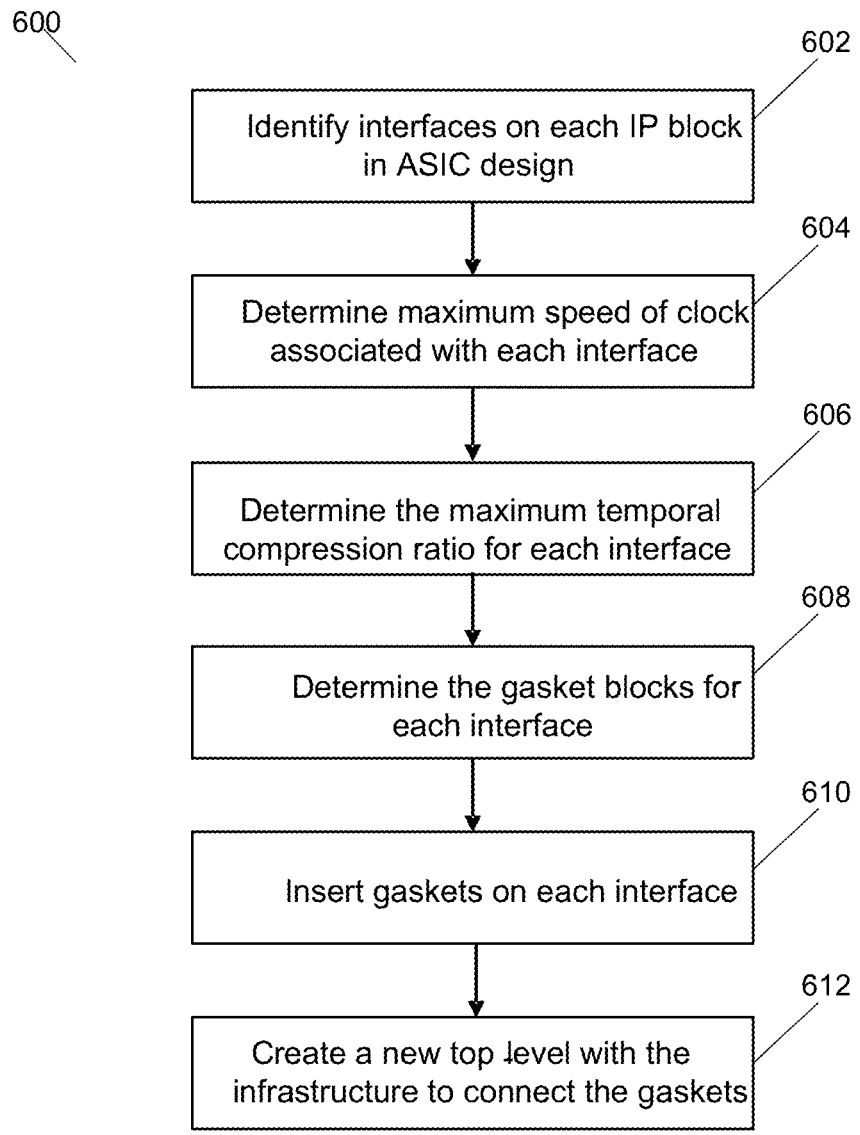
FIG. 6 is a flowchart illustrating an exemplary process for gasket generation according to various embodiments.

FIG. 6 is a flowchart (600) illustrating a process 600 for gasket generation according to various embodiments. Referring to FIG. 6, in some embodiments, the process (600) may implement gasket insertion at the simplified placement step (518). In several embodiments, the process (600) encompasses six steps: identification of interfaces (602) existent on each IP block; assessment of maximum speed of clock associated with each interface (604); computation of temporal compression ratio for each interface (606); determine the gasket blocks for each interface (608); insertion of gaskets associated with each interface (610); and creation of a new top-level with the infrastructure required to connect the previously-inserted gaskets (612).

In some embodiments, the identification of communication interfaces existent on each IP block (602) creates a semantical map between the ports of each IP block and the communication interfaces employed by the IP. In other words, this step groups IP's ports that belong to the same interface, while generating information about the protocol that the interface may need to comply with. The maximum speed of clock associated with each interface is determined next (804).

According to several embodiments, the maximum temporal compression ratio of each interface is determined based on the maximum speed of clock (operating frequency) associated with the interface (606). Chronos Channels do not have a global clock signal, hence their basic performance cannot be defined as an operating frequency, but rather as a cycle time. In such channels, the cycle time is defined as the time between two consecutive transactions when the Channel is always transmitting data. In other words, the cycle time of a Chronos Channel dictates how fast it can consume the data of a producer and how fast it will generate data to a consumer. The minimum cycle time of a Chronos Channel indicates the maximum possible throughput that can be achieved by it. In various embodiments, the maximum temporal compression ratio is computed in order to match the throughput of a Chronos Channel to the throughput of the interface. Next, in various embodiments, the connections between interfaces are traced based on the top-level design, and the gasket blocks are determined (608) in order to ensure that communicating interfaces have compatible temporal compression ratios. At top-level some designs may contain flip-flops or latches or other logic cells to propagate data along the Link, which may be reported, removed, and/or replaced by repeaters. In some embodiments, the last two steps of the gasket generation flow (600) create modified versions of the IP block design source files that include the gaskets (610) and the top-level design source file(s) including the infrastructure to connect them (612).

In various embodiments, the gasket generation flow (600) is implemented by a software called "gasketizer". The gasketizer can include code that defines an RTL parser in order to understand the design hierarchy, links between IP blocks, and the ports of IPs. It can also include a Liberty and constraint file parser to understand the timing requirements of IP block's ports, which can be used to compute the maximum operating frequency. The gasketizer may be able to automatic identify interfaces based on port naming and protocol restrictions, compute the temporal compression ratio for interfaces, and create new RTL implementations containing IP blocks with the associated gaskets along with the top-level with the infrastructure required to connect gaskets. Optionally, the gasketizer may be able to group IP blocks and glue-logic in clusters in order to avoid the insertion of gaskets on certain blocks.

Performance of the Chronos Channel can be calculated by timing analysis of the delays along forward and backward channel data paths. A pseudo clock may be defined in the timing constraints and connected to repeaters along the channel. The cell pins of these repeaters may have timing check tables defined in their libraries, where the internal cell delays may be split between the input setup and clock-to-output definitions. The cell pins may or may not have the actual arc described in the table. The pseudo clock may not be an active design clock, but can be a mechanism to enable static timing analysis (STA) of the channel for delay analysis, optimization, and cycle time calculation. Alternatively, or in combination with the pseudo clock, a maximum delay constraint, or other constraint, may be applied to the forward and backward paths for analysis and optimization.

Channel repeaters are used to propagate data along the channel between gaskets, and can be represented as a single cell or composed as a group of cells. These repeaters may be inserted based on wirelength, capacitance, resistance, delay based timing analysis, or other design characteristics. There may be restrictions on the minimum number of repeaters, or total number of repeaters, that may exist on a channel. After insertion the repeater count may be updated into the original design source code for functional equivalence and performance analysis. The model of channel cells may be as multi-bit flip-flop or as multi-bit buffer, or another functional description. The multi-bit flip-flop model can be used along with the pseudo-clock for channel timing analysis and optimization. The multi-bit buffer model can allow view as pass thru circuit, for functional equivalence analysis without modification of the logic design parameters, and also to ease automation of insertion and removal of repeaters with electronic design automation (EDA) tools. Power analysis of the gasket and channel circuits may use custom activity definitions, depending on the compression ratios used within them.

Figure 7:
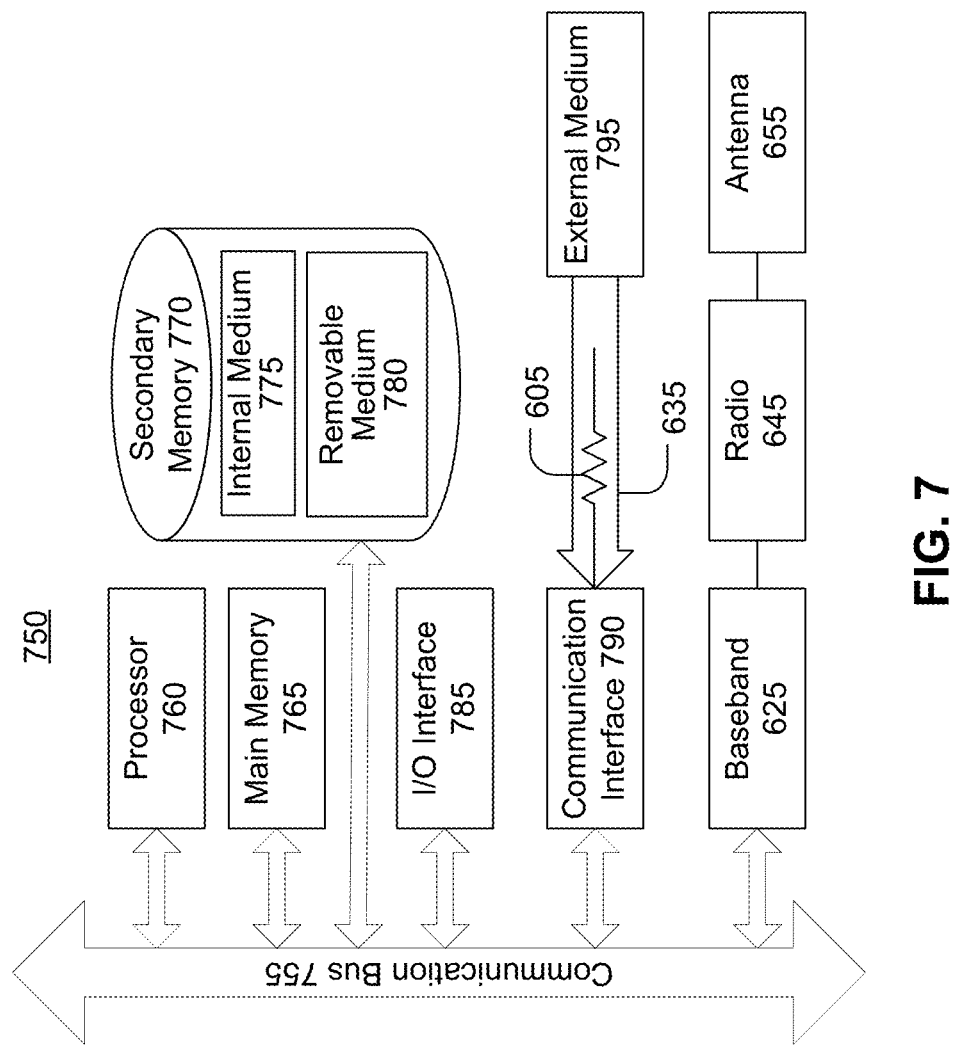
FIG. 7 is a block diagram illustrating an exemplary wired or wireless system according to various embodiments.

FIG. 7 is a block diagram illustrating a wired or wireless system 750 according to various embodiments that may utilize the systems and methods described above in reference to the other Figures. For example, the system 750 could be utilized to perform the process 600 of FIG. 6. In various embodiments, the system 750 may be a conventional personal computer, computer server, personal digital assistant, smart phone, tablet computer, or any other processor enabled device that is capable of wired or wireless data communication. A person having ordinary skill in the art can appreciate that other computer systems and/or architectures may be used without departing from the scope of the present inventive concept.

The system 750 preferably includes one or more processors, such as processor 760. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 760.

The processor 760 is preferably connected to a communication bus 755. The communication bus 755 may include a data channel for facilitating information transfer between storage and other peripheral components of the system 750. The communication bus 755 further may provide a set of signals used for communication with the processor 760, including a data bus, address bus, and control bus (not shown). The communication bus 755 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

The system 750 preferably includes a main memory 765 and may also include a secondary memory 770. The main memory 765 provides storage of instructions and data for programs executing on the processor 760. The main memory 765 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 770 may optionally include an internal memory 775 and/or a removable medium 780, for example a floppy disk drive, a magnetic tape drive, a compact disc ("CD") drive, a digital versatile disc ("DVD") drive, etc. The removable medium 780 is read from and/or written to in a well-known manner. Removable medium 780 may be, for example, a floppy disk, magnetic tape, CD, DVD, SD card, etc.

The removable medium 780 is a non-transitory computer readable medium having stored thereon computer executable code (i.e., software) and/or data. The computer software or data stored on the removable medium 780 is read into the system 750 for execution by the processor 760.

In alternative embodiments, secondary memory 770 may include other similar means for allowing computer programs or other data or instructions to be loaded into the system 750. Such means may include, for example, an external medium 795 and a communication interface 790. Examples of external medium 795 may include an external hard disk drive or an external optical drive, or and external magneto-optical drive.

Other examples of secondary memory 770 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are a removable medium 580 and a communication interface 790, which allow software and data to be transferred from an external medium 795 to the system 750.

The system 750 may also include an input/output ("I/O") interface 785. The I/O interface 785 facilitates input from and output to external devices. For example the I/O interface 785 may receive input from a keyboard or mouse and may provide output to a display. The I/O interface 785 is capable of facilitating input from and output to various alternative types of human interface and machine interface devices alike.

The communication interface 790 allows software and data to be transferred between system 750 and external devices (e.g. printers), networks, or information sources. For example, computer software or executable code may be transferred to system 750 from a network server via communication interface 790. Examples of communication interface 790 include, for example, but not limited to, a modem, a network interface card ("NIC"), a wireless data card, a communications port, a PCMCIA slot and card, an infrared interface, and an IEEE 1394 fire-wire.

The communication interface 790 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via the communication interface 790 are generally in the form of electrical communication signals 605. In one exemplary embodiment, these electrical communication signals 605 are provided to the communication interface 790 via a communication channel 635. In one embodiment, the communication channel 635 may be a wired or wireless network, or any variety of other communication links. The communication channel 635 carries the electrical communication signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 765 and/or the secondary memory 770. Computer programs can also be received via communication interface 590 and stored in the main memory 765 and/or the secondary memory 770. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 750. Examples of these media include the main memory 765, the secondary memory 770 (including the internal memory 775, the removable medium 780, and the external medium 795), and any peripheral device communicatively coupled with the communication interface 790 (including a network information server or other network device). These non-transitory computer readable mediums are means for providing executable code, programming instructions, and software to the system 750.

In one embodiment implemented using software, the software may be stored on a computer readable medium and loaded into the system 750 by way of the removable medium 780, the I/O interface 785, or the communication interface 790. In such an embodiment, the software is loaded into the system 750 in the form of electrical communication signals 605. The software, when executed by the processor 760, preferably causes the processor 760 to perform the inventive features and functions previously described herein.

The system 750 also includes optional wireless communication components that facilitate wireless communication over a voice and over a data network. The wireless communication components comprise an antenna system 655, a radio system 645 and a baseband system 625. In the system 750, radio frequency ("RF") signals are transmitted and received over the air by the antenna system 655 under the management of the radio system 645.

In one embodiment, the antenna system 655 may comprise one or more antennae and one or more multiplexors (not shown) that perform a switching function to provide the antenna system 655 with transmit and receive signal paths. In the receive path, received RF signals can be coupled from a multiplexor to a low noise amplifier (not shown) that amplifies the received RF signal and sends the amplified signal to the radio system 645.

In alternative embodiments, the radio system 645 may comprise one or more radios that are configured to communicate over various frequencies. In one embodiment, the radio system 645 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 645 to the baseband system 625.

If the received signal contains audio information, then baseband system 625 decodes the signal and converts it to an analog signal. Then the signal is amplified and sent to a speaker. The baseband system 625 may also receive analog audio signals from a microphone. These analog audio signals are converted to digital signals and encoded by the baseband system 625. The baseband system 625 also codes the digital signals for transmission and generates a baseband transmit audio signal that is routed to the modulator portion of the radio system 645. The modulator mixes the baseband transmit audio signal with an RF carrier signal generating an RF transmit signal that is routed to the antenna system 655 and may pass through a power amplifier (not shown). The power amplifier amplifies the RF transmit signal and routes it to the antenna system 655 where the signal is switched to the antenna port for transmission.

The baseband system 625 may also be communicatively coupled with the processor 760. The processor 760 has access to main memory 765 and/or secondary memory 770. The processor 760 is preferably configured to execute instructions (i.e., computer programs or software) that can be stored in the main memory 765 or the secondary memory 770. Computer programs can also be received from the baseband system 625 and stored in the main memory 765 or in secondary memory 770, or executed upon receipt. Such computer programs, when executed, enable the system 750 to perform the various functions of the present invention as previously described. For example, the main memory 765 may include various software modules (not shown) that are executable by processor 760. Claims and their equivalents are intended to cover such forms or modifications as would fall within the scope and spirit of the protection. For example, the example apparatuses, methods, and systems disclosed herein can be applied wireless communication devices incorporating HF and/or UHF RFID reader capabilities. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

Embodiments herein provide for a Double Nature Arc Abstraction Timing Model for standard cells, for example, of the ASICs described herein. Embodiments of herein may also be implemented in the design of the ASICs as described herein, as well as, individually or in combination, in U.S. application Ser. No. 15/644,696, the disclosure of which is incorporated herein by reference in its entirety as if set forth in full. The Double Nature Arc Abstraction Timing Model may be an abstract representation of timing arcs of a cell, based on using a mixture of one or more of sequential and combinatorial timing arcs. By doing so, it enables representing individual cycles of directed cyclic graphs as directed acyclic graphs, which are compatible with standard static timing analysis tools. This provides a strong framework to perform timing analysis and optimization of the cycle time of circuits with logic loops that are not captured by a more traditional control reference signal (e.g., a clock signal).

Industrial EDA tools rely on static timing analysis (STA) to evaluate and optimize the performance of a circuit. These tools are typically based on directed acyclic graphs, in order to help them to quickly converge to solutions. Fortunately for synchronous design, the register transfer level (RTL) abstraction provides the perfect match for traditional STA because every path can be represented by a directed acyclic graph.

Cell libraries rely on models to represent electrical and physical information of their cells (such as performance, power, area, noise, etc.). The traditional models to represent performance of cells rely on tables that provide timing information of a cell at a given condition, depending on the load it is driving, the input transition time, the corner, etc.

Figure 8:
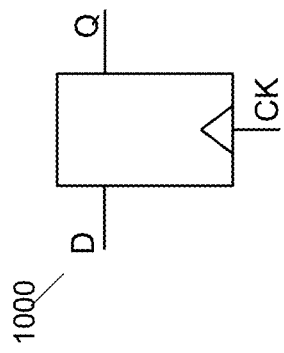
FIG. 8 illustrates an example of a NOR gate according to various embodiments.
Figure 9:
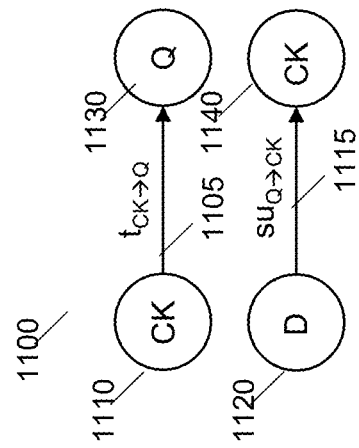
FIG. 9 illustrates an example graph representation of combinational timing arcs of the NOR gate of FIG. 8 according to various embodiments.

For combinational cells, these models consist of combinational timing arcs, where every possible functional path from an input pin to an output pin will have a table for the propagation and the transition delays. For example, assuming the NOR gate 800 shown in FIG. 8, there are possible logic paths from input A to output Y and from input B to output Y. The performance of these logic paths can be illustratively represented by a set of two timing arcs: tA→Y and tB→Y. These arcs can be then divided between rising and falling, depending on the logic function of the cell. FIG. 9 shows a graph 900 that represents these arcs, where each node 910, 920, and 930 is a port A, B, and Y, respectively, of the NOR cell 800 and the edges 905, 915 are the timing arcs. This is an example model employed for STA.

Figure 10:
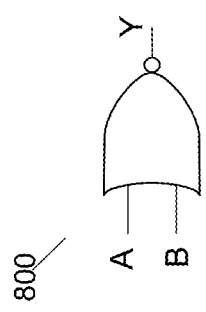
FIG. 10 illustrates an example of a D Flip Flop according to various embodiments.

Sequential cells, on the other hand, rely on sequential timing arcs, where propagation and transition delays are only valid for paths starting from a control input signal (typically a clock). Additionally, sequential arcs also count with a setup arc that dictates a timing constraint for an input with respect to the control signal. For example, FIG. 10 shows the symbol of a D Flip Flop 1000 and FIG. 11 shows its respective set of sequential timing arcs, represented in a graph 1100.

Figure 11:
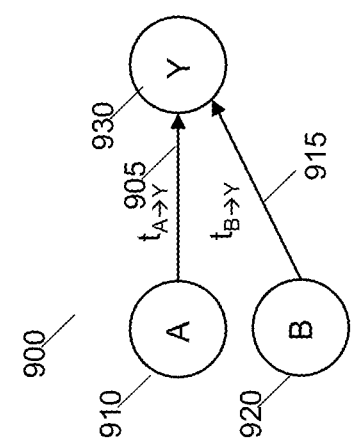
FIG. 11 is an example graph representation of sequential timing arcs of the D Flip Flop of FIG. 10.

As shown in FIG. 11, output Q 1130 will only have a valid timing arc 1105 starting at the CK input 1110. Also, this cell has a setup arc 1115 from input D 1120 to CK 1140, that constraints the minimum amount of time that D should be stable before a capturing transition in the CK signal, as well as a hold arc (not shown) from input D to control CK, that constraints the minimum amount of time that D should be stable after the transition of the CK signal.

Figure 12:
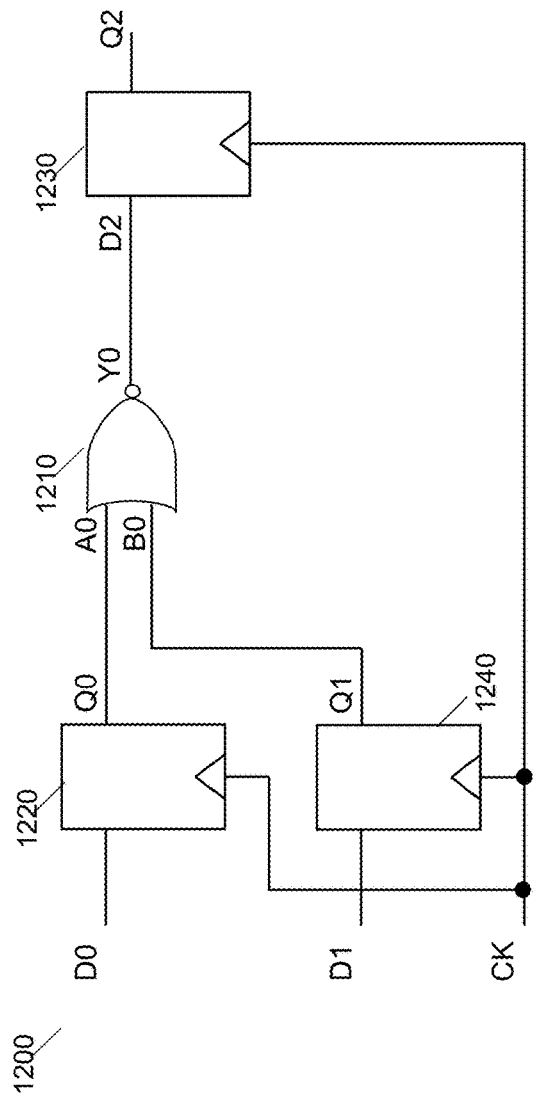
FIG. 12 illustrates an example circuit fragment comprising a NOR gate and a plurality of D Flip Flops.

Although these models may not seem that useful in isolation, they provide powerful means for STA tools to analyze and optimize performance in a clocked circuit. For example, FIG. 12 shows a fragment 1200 of circuit using a NOR 1210 (which may be substantially similar to NOR 800) and multiple of D Flip Flops 1220-1240 (each of which may be substantially similar to D Flip Flops 1000). Accordingly, the two input data signals D0 and D1 may be sampled at the input flops 1220, 1240, respectively, which feed NOR gate 1210 that is connected to an output flop 1230 that generates output Q2. Data processing in this circuit is controlled by CK.

Figure 13:
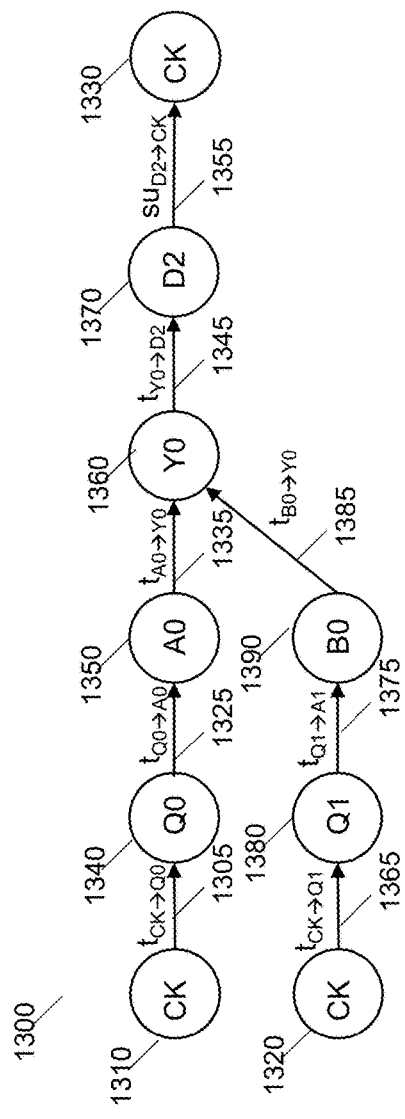
FIG. 13 illustrates an example graph representation for the timing arcs in the circuit fragment of FIG. 12.

FIG. 13 shows the equivalent graph 1300 that can be constructed using the timing arcs of the NOR and D Flip Flop cells (e.g., timing arcs 900 and 1000, respectively). As shown in FIG. 13, the graph 1300 is directed and acyclic. Every path starts at CK 1310, 1320 and finishes at CK 1320, characterizing what is called a start-point (the beginning of the path at CK 1310 and/or 1320) and an endpoint (the end of a path at CK 1330). CK 1310, 1320, and 1330 may be the same CK node as illustrated in FIG. 12. For this analysis, tools may not have physical information of the actual clock signals and may assume an ideal clock to start using insertion delays to adjust the tCK→Q arcs 1305, 1315. Nevertheless, the model is the same, where combinational gates will have timing arcs from its inputs to its outputs and sequential gates will have arcs that characterize start-points and end-points.

This works well for synchronous systems, because indeed every path will start and end at instants in time controlled by the clock signal. However, in non-synchronous ASIC designs, circuits may have interdependent sequential states, and performance may rely on a directed cyclic graph model that is not compatible to traditional STA.

Figure 14:
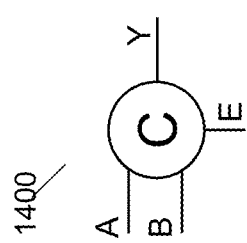
FIG. 14 illustrates a 2 input C-element cell with a virtual control input according to various embodiments.

Thus, embodiments herein may utilize Double Nature Arc Abstraction, where inputs and outputs of a cell can have both sequential and combinational arcs at the same time. This is fundamentally different from contemporary models, where the output of a cell can implement either a sequential or a combinational function. For example, assuming a C-element 1400 of FIG. 14 with inputs A and B and output Y. Also, for the sake of compatibility with standard STA, let us assume a virtual control input E, which may not physically exist and whose sole purpose is for this performance model. The symbol of such a cell is showed in FIG. 14.

Figure 15:
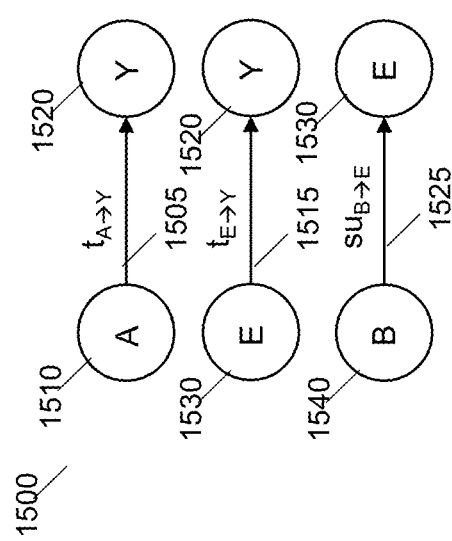
FIG. 15 illustrates an example graph representation of the Double Nature Arcs of the C-element of FIG. 14 according to various embodiments.

For this cell, we can assume that Y has a combinational arc from A, tA→Y, and a sequential arc between B and E, tE→Y and suB→E. Hold arcs are not relevant to this model. The relevant arcs 1505-1525 are showed in FIG. 15. Note that this is fundamentally different from traditional models, because the cell behaves either as a combinational gate or a sequential gate, depending on the input being exercised. Even when considering latches, this is different, because all arcs of a latch are referenced to a control signal, while here the tA→Y arc 1505, for example is completely independent from the E signal. The same may be true for the other arcs 1515 and/or 1525

Figure 16:
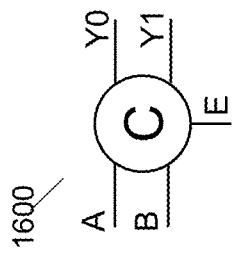
FIG. 16 illustrates an example alternative representation of the C-element of FIG. 14 according to various embodiments.
Figure 17:
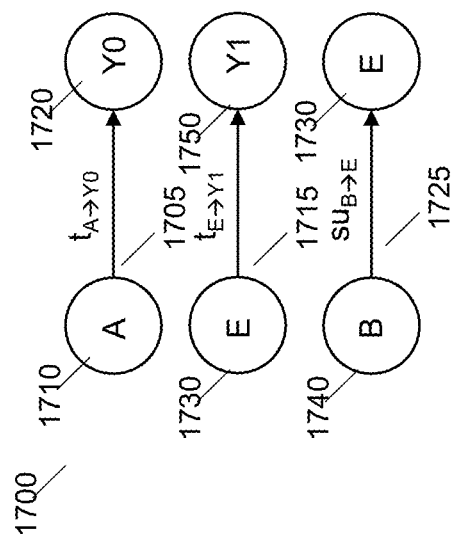
FIG. 17 illustrates an example graph representation of the Double Nature Arcs of the C-element of FIG. 16 according to various embodiments.

Note that in some tools, such modeling may be considered a violation, because of the double nature of the arcs (e.g., as combinational or sequential) of the output pin. In these situations, the model may be configured with multiple outputs representing the same physical output. For example, FIG. 16 shows an alternative representation C-element 1600 of the C-element 1400 of FIG. 14, where output Y is divided in Y0 and Y1. Although these outputs may be physically tied to the same signal, for the STA tool they may be distinct outputs, which waive the violation. Output Y0 is then used for the combinational arc 1705 from A. Output Y1 is used for the sequential arc 1725, 1715 along with B and E. The equivalent arcs are showed in FIG. 17.

Figure 18:
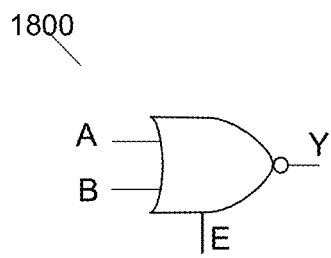
FIG. 18 illustrates a symbol of a NOR according to various embodiments.

In some embodiments, the Double Nature Arc Abstraction can be generalized to different arc types depending on the type of transition of the circuit. For example, FIG. 18 illustrates a NOR gate 1800 that is substantially similar to the NOR gate 800 of FIG. 8, which counts with inputs A and B and output Y. Note that the NOR gate 1800 also comprises a virtual control input E, for the sake of compatibility. Using embodiments described herein, these cells can have a sequential arc for the rising transition of Y, along with the falling transitions of A and B (e.g., timing arcs 1935, 1945, 1905); and a combinational arc for the falling transition of Y (e.g., timing arcs 1915, 1925). These arcs are showed in FIG. 19.

Figure 19:
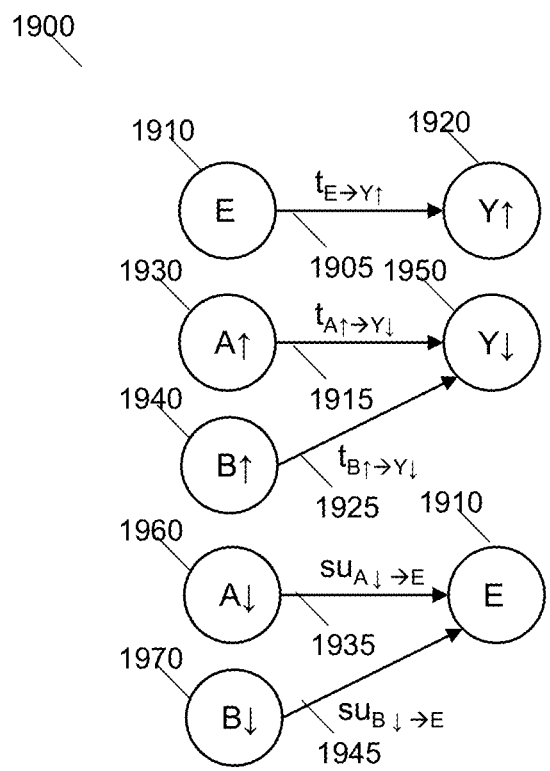
FIG. 19 illustrates an example graph representation of the Double Nature Arcs of the NOR of FIG. 18 according to various embodiments.

As shown in graph 1900 of FIG. 19, there is a mixture of combinational and sequential arcs. When inputs have rising transitions (e.g., nodes 1930 and 1940), Y has a combinational arc 1915 and 1925 for a falling transition (e.g., node 1950), tA↑→Y↓ and tB↑→Y↓. When inputs have falling transitions (e.g., nodes 1960, 1970), they have a setup arc 1935, 1945, respectively, to the control signal: suA↓↑→E and suB↓↑→E. Also, Y has a rising transition controlled by signal E: tE→Y↑ (e.g., nodes 1910 and 1920 and timing arc 1905). Note that transitions types in the E signal are not distinguished because they can be either rising or falling, without loss of generality. This kind of model helps modelling cyclic graphs where it is known that cycles start with a rising transition in a NOR gate and finish with a falling transition reaching it, while still accepting rising transitions through Y without breaking the timing path.

Figure 20:
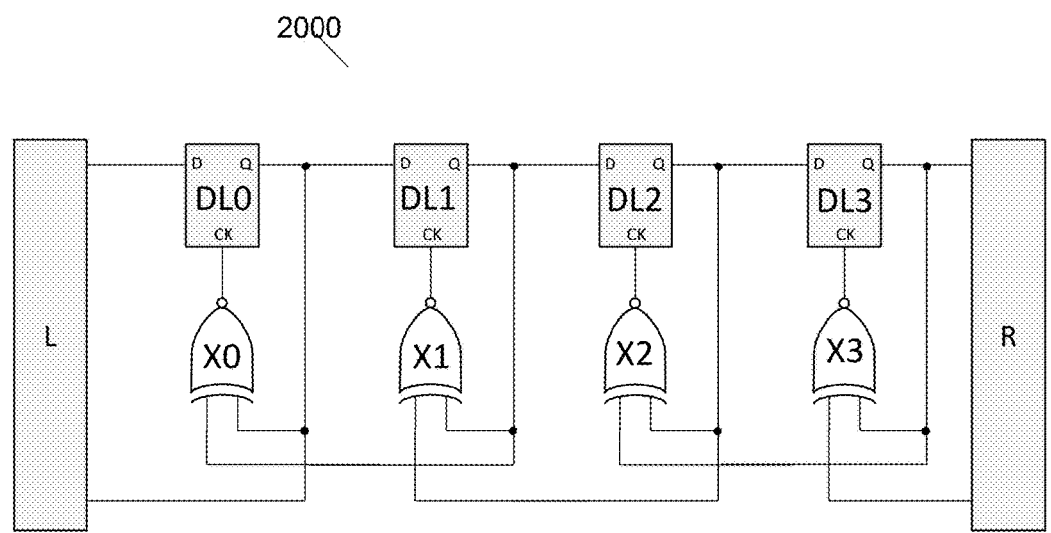
FIG. 20 illustrates a circuit fragment of an example control pipeline according to various embodiments.

FIG. 20 illustrates a fragment 2000 of a control pipeline that is implemented for usage in accordance with embodiments described in the present disclosure. Fragment 2000 may server as an example for the usage of embodiments of the model described herein and may be a purely control pipeline comprising a plurality of mousetrap circuits. FIG. 20 shows an example a pipeline, where 4 D latches (DL0-DL3) are arranged in series with a set of controlling XOR gates (X0-X3). FIG. 20 also shows an L block, which may be configured to inject control signals from the left side of the pipeline and an R block that may be configured to consume control signals at the right side of the pipeline. These blocks may be abstractions of circuits that could be interfacing this pipeline, e.g., IP blocks or components of the ASICs described throughout the present disclosure.

Figure 21:
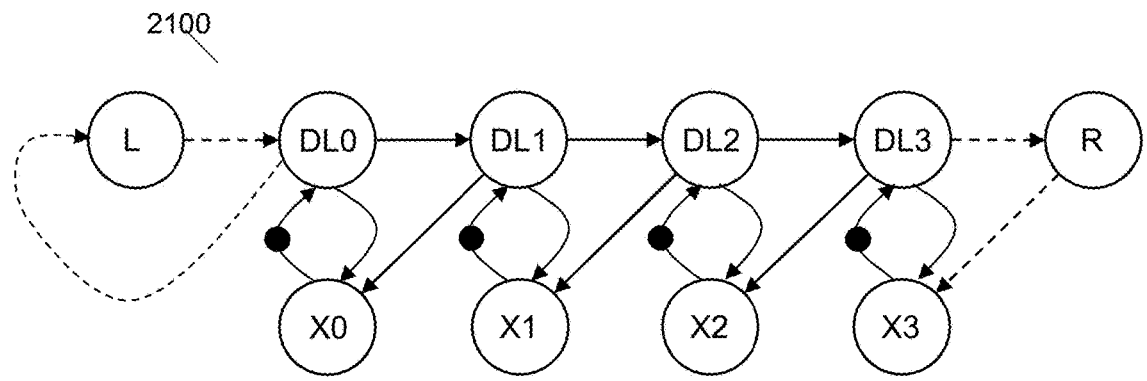
FIG. 21 illustrates an example graph representation of the behavior of the circuit of FIG. 20 according to various embodiments.

Circuit 2000 can be used for controlling events, for example, typically in non-synchronous designs. The behavior of the circuit 2000 can be expressed using a graph 2200, as shown in FIG. 21. For example, assuming an initial state where the pipeline 2000 is stable and all the latches are at logic 0, and consequently they are all transparent. As the graph 2200 shows, a transition to 1 in L will cause each of the following latches (e.g., DL0-DL3) to switch to 1 as well. At the same time, as the latches sequentially switch to 1, each latches will propagate their respective control signals backwards to a prior XOR gate (e.g., DL1 to X0, DL2 to X1, etc.). Such backward propagation will cause each prior latches (e.g., DL0, DL1, etc., respectively) to become opaque until the next element (e.g., next or subsequent latches) receives its current data. This cyclic behavior has its performance captured by the classic marked graph model 2100, represented in FIG. 21.

Figure 22:
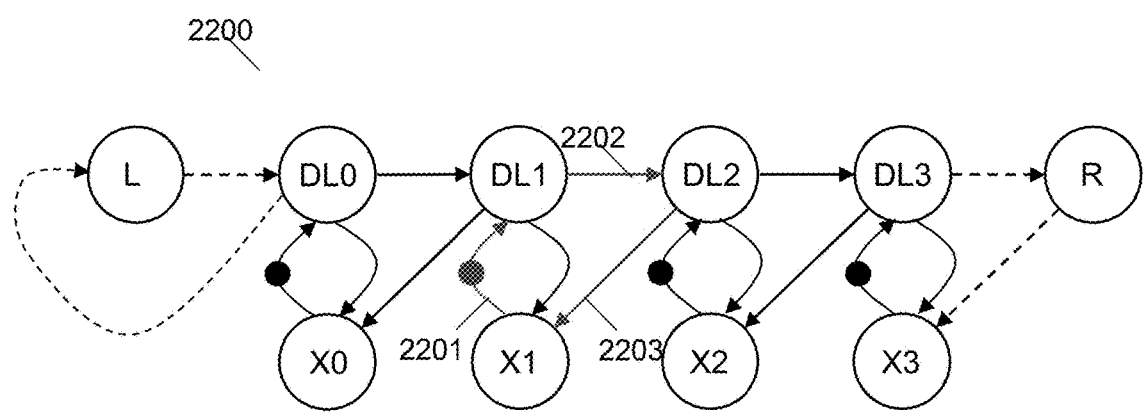
FIG. 22 illustrates an example of cycle of the model of FIG. 22 according to various embodiments.

For example, FIG. 22 shows an example cycle of graph 2200 (marked in as grey line). The graph 2200 is similar to the graph 2100 but shows an example cycle of graph 2100.

As the graph 2200 shows, in some implementations it may be assumed that the system will initially have a token at the output of every XOR element, showed by the dot marks (e.g., the black dots in edges between an XOR and its corresponding latches, for example, X0 and DL0). As new tokens are injected through L, this concurrent system may start exchanging tokens according to its functionality. The speed at which it can respond to new token injections is dictated by the worst case cycle time of this model. For example, FIG. 22 shows a possible cycle of graph 2200 (marked as a grey line). That is, a cycle may be characterized by the path from a dot mark, through the graph 2200, and back to its original position (e.g., 2301-2303). The path that takes the longest time will be the limiting cycle in the system, and therefore will limit the overall performance.

Figure 23:
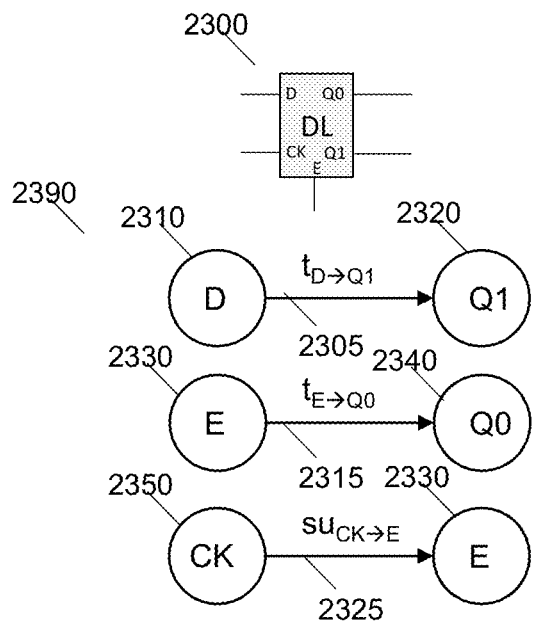
FIG. 23 illustrates an Example of double nature arc abstraction representation of latch, symbol and arcs according to various embodiments.

Referring to FIG. 20, it becomes clear that these cycles cannot be analyzed using a traditional latch model. This is because every path is broken when it meets a latch, while the performance model assumes that paths should be crossing these latches without breaking the path. Note that not even time borrowing techniques could be applied here because, for the STA tool, the paths would start and end at the same clock cycle and no timing could be borrowed. Advantageously, as FIG. 23 shows, using embodiments described herein, latches 2300 that can have a sequential arc to allow capturing the start and end of each cycle, as well as a combinational arc, for paths crossing them through a cycle as shown in graph 2390 (e.g., similar to those described above in connection to the C-element 1600 of FIG. 16).

Figure 24:
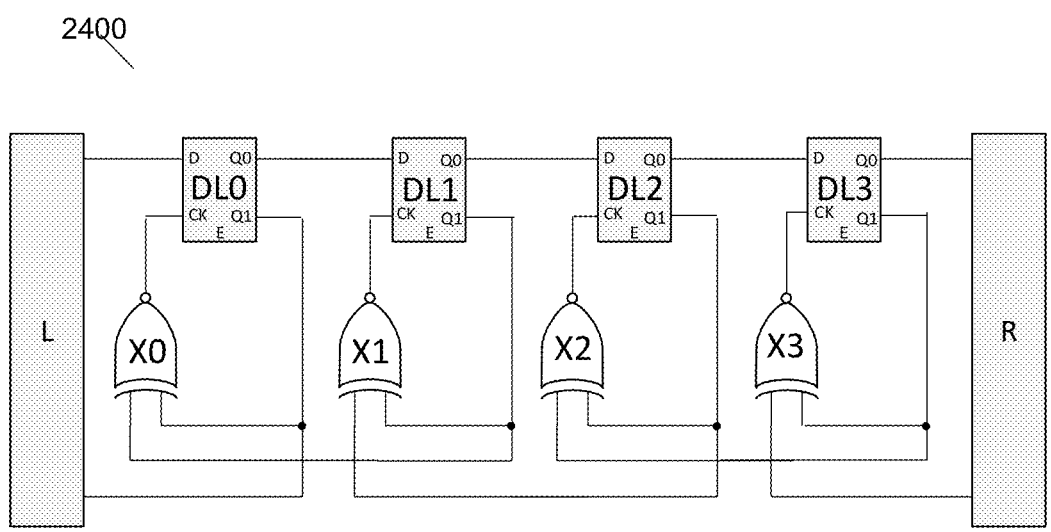
FIG. 24 illustrates a circuit fragment of the control pipeline of FIG. 21 comprising a double nature arc abstraction latch model according to various embodiments.

Using this embodiment, a slightly different representation of the pipeline 2000 of FIG. 20 may be achieved, shown as pipeline 2400 in FIG. 24. Utilizing embodiments herein facilitates an improved model for analyzing the cyclic behavior of FIG. 22. Accordingly, for such implementations, the STA tool would observe tE→Q0 (e.g., timing arc 2315 of FIG. 23) for DL1, followed by the tD→Q1 arc (e.g., timing arc 2305) for DL2, followed by the combinatorial input to output arc of the XOR and, finally the tCK→E (e.g., timing arc 2325) for DL1. This analysis can be generalized to allow analyzing all other arcs, even multiple mark arcs.

Figure 25:
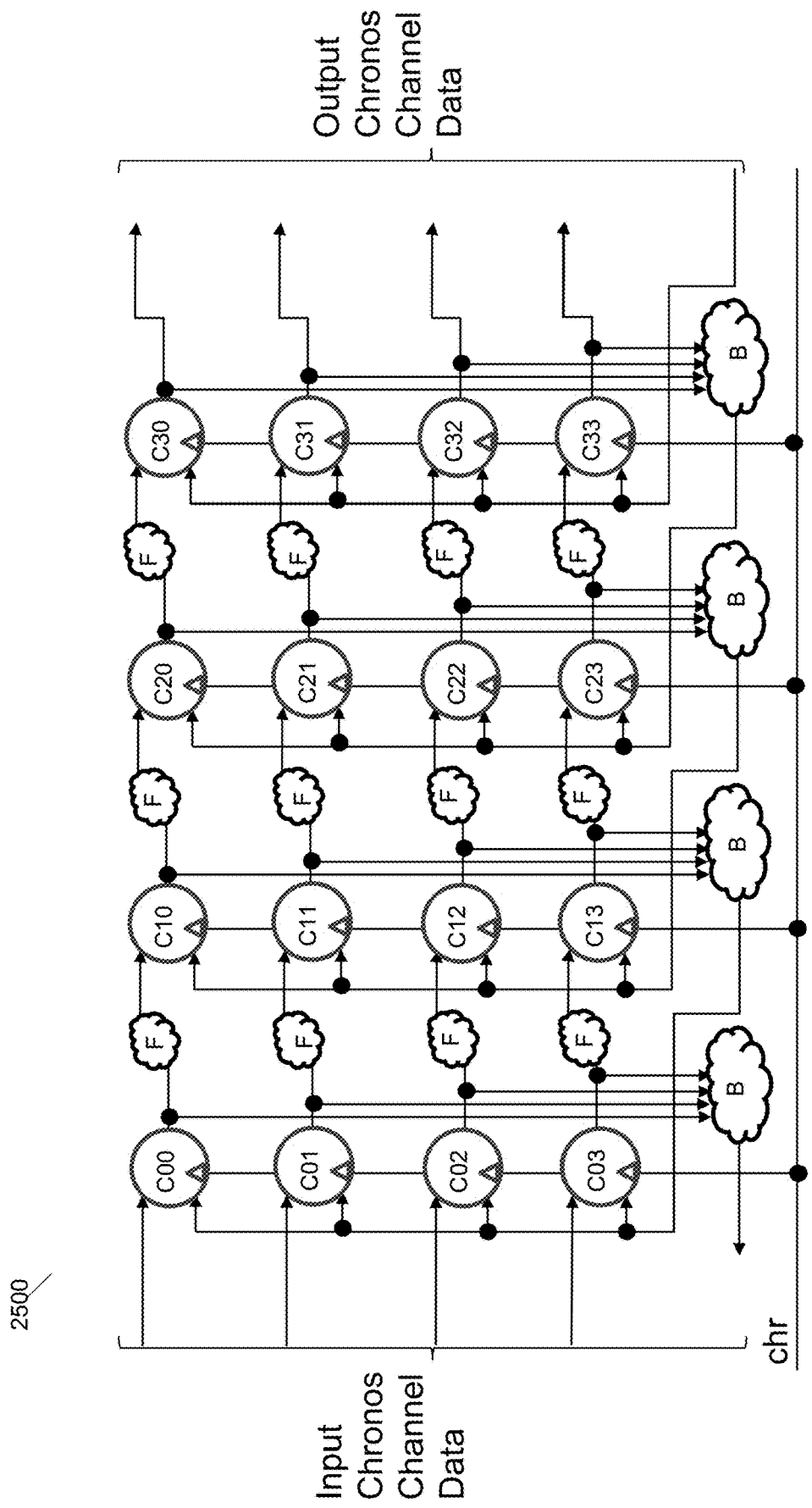
FIG. 25 illustrates an example circuit fragment of a logic path within a Chronos Channel according to various embodiments.

Another example is a C3T flow, which provides for improved analysis and optimization of a cycle time of a Chronos Channels. FIG. 25 illustrates an example of fragment 2500 of a Chronos Channel, for example, as described above and in the '852 patent, the disclosure of which is incorporated herein by reference in its entirety as if set forth in full. FIG. 25 illustrates fragment 2500 comprising a plurality of C-elements that may be the basic elements in such paths and can have combinational logic (represented by clouds) between them. In fact, C-elements may be the sequential components of a Chronos Channel and a basis for STA and optimization (as described in the '852 patent). The C-elements illustrated in FIG. 25 may be C-elements described, for example, in connection to FIG. 14. The path moving forward in the Chronos Channel, connections between C-elements from left to right in FIG. 25, may be referred to as a forward logic path. For example, the path from the output of C00 to the input of C10 is a forward path of the fragment 2500. Note that combinational logic between C-elements is represented as a cloud marked with an F. Similarly, the path moving backwards in the Chronos Channel, for example, from right to left in FIG. 25 may be referred to as a backward logic path. For example, the path from the output of C10 to the input of C00 is a backward path. Also note that combinational logic between C-elements is represented as a cloud marked with a B.

Figure 26:
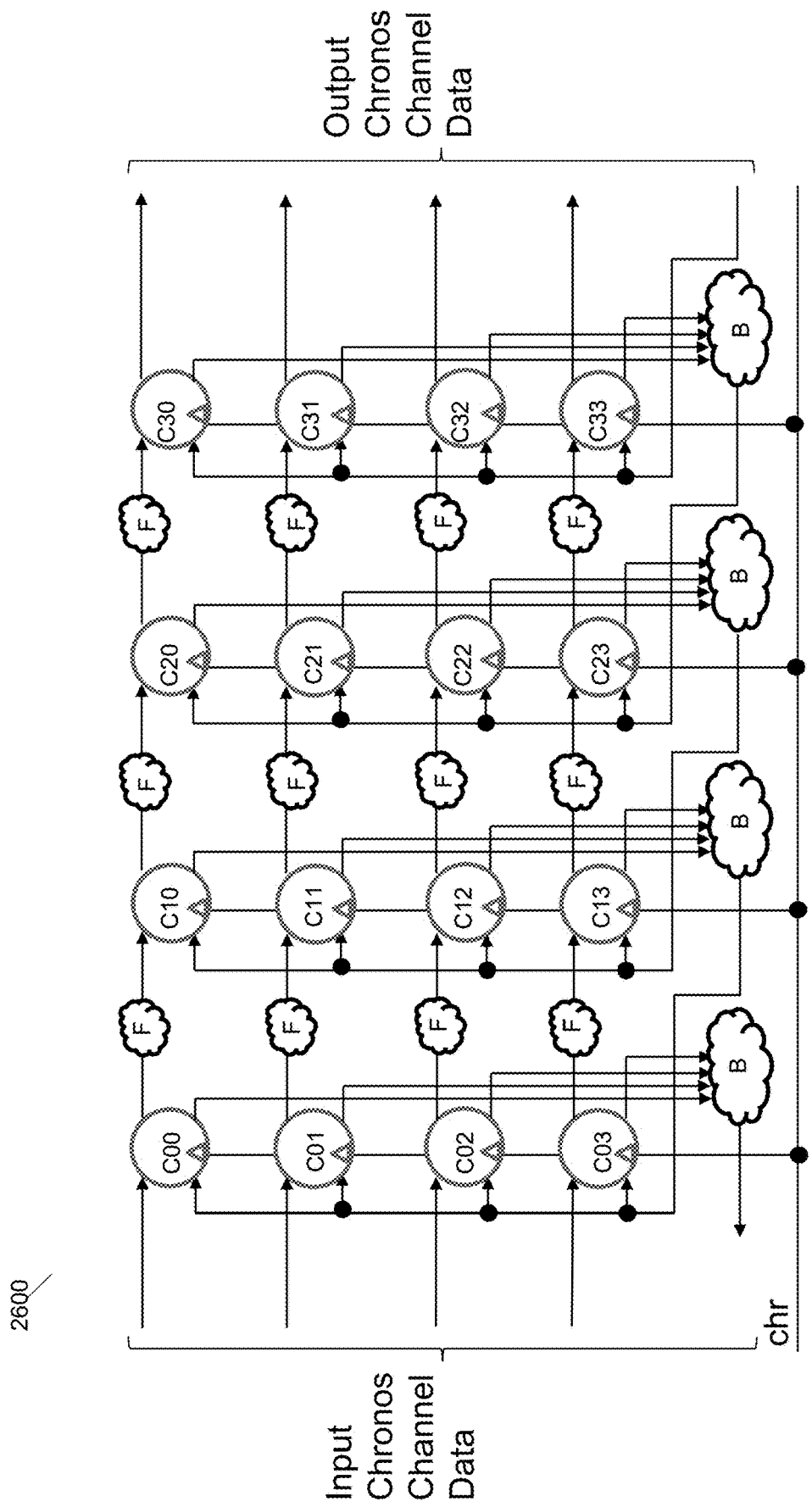
FIG. 26 illustrates another representation of the example circuit fragment of FIG. 25 according to various embodiments.

The performance of a Chronos Channel, referred to as cycle time, may be a function of the sum of the delay of forward and backward path logic delays (as described in the '853 patent). For example, in a Chronos Robust Channel, data may be transmitted using a 4-phase handshake protocol and, therefore, its cycle time may be defined as 2 times the summation of the delay of forward and backward paths logic. Hence, to optimize the performance of a Chronos Channel, one must optimize the respective delays of each such paths. To do so C-elements of each pathway may be modeled using the embodiments herein of the double nature arc abstraction (e.g., the C-elements 1600 of FIG. 16). An example of such an implementation is illustrated in FIG. 26.

Using embodiments of C-element double nature arc abstraction model, Chronos Channel circuits may utilize a simple modification: all forward logic paths must start from output Y1 and end at A, and all backward logic paths must start from Y0 and end at B. FIG. 26 shows the same fragment of circuit presented in FIG. 25, except for the representation 2600 is implements a C3T flow using the C-element 1600 model of FIGS. 16-17. As illustrated in FIG. 26, valid paths for STA now start at the E pin of each C-element that is connected to a global chr signal, then propagate to each respective Y1 and through the forward logic path logic (represented as clouds marked with an F) to reach the next C-element in the circuit (e.g., via an A pin of the next C-element). Each C-element also propagates the data signal to its Y0 output through a combinational arc through the backward logic path (represented as clouds marked with a B), and returns to the first C-element at the corresponding B input. For example, in the fragment 2600, a path is established that starts in the E pin of C00, propagates and/or reaches C10 through a forward logic path, and then propagates through the backward logic path such that it is captured back at C00.

While various embodiments have been described above, it should be understood that they have been presented by way of example only, and not of limitation. The breadth and scope should not be limited by any of the above-described example embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example, for example, interchangeably between the various embodiments. One of ordinary skill in the art would also understand how alternative functional, logical or physical partitioning and configurations could be utilized to implement the desired features of the described embodiments.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. The accompanying claims and their equivalents are intended to cover such forms or modifications as would fall within the scope and spirit of the protection. Also, the features and attributes of the specific example embodiments disclosed above may be combined in different ways to form additional embodiments, all of which fall within the scope of the present disclosure.

Furthermore, although items, elements or components can be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases can be absent.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method of designing communication interfaces between multiple components of an application specific integrated circuit (ASIC) chip, comprising:
   identifying, with a processor, interfaces and communication protocols used between pairs of components of the multiple components of the ASIC chip;
   modeling a double nature arc abstraction of the identified interfaces of the multiple components, the double nature arc abstraction comprising a mixture of sequential and combinatorial timing arcs;
   determining, with the processor, timing estimates between the pairs of components of the multiple components of the ASIC chip using the modeled double nature arc abstraction of the identified interfaces of the multiple components; and
   based on the identified communication protocols and the determined timing estimates between the pairs of components of the multiple components of the ASIC chip, configuring, with the processor, gaskets to insert into the interfaces of the multiple components of the ASIC chip, the gaskets configured to provide control of timing requirements of a communications link between the pairs of components of the multiple components of the ASIC chip,
wherein the designed communication interfaces are usable in fabrication of the ASIC chip.

2. The method of claim 1, wherein the interfaces of the multiple components comprise sequential and combinational arcs.

3. The method of claim 1, wherein the communications link utilizes a communication protocol method comprising:
using delay insensitive (DI) codes to encode information to be communicated between the pairs of components of the multiple components of the ASIC chip,
using quasi-delay-insensitive-logic to communicate the encoded information between the pairs of components of the multiple components of the ASIC chip,
using temporal compression between the pairs of components of the multiple components of the ASIC chip, and
using signals to indicate availability and readiness of information to be communicated between the pairs of components of the multiple components of the ASIC chip.

4. The method of claim 1, wherein, determining the timing estimates between the pairs of components of the multiple components of the ASIC chip comprises:
determining a maximum speed of a clock used for each of the interfaces of the pairs of components; and
determining a maximum temporal compression ratio to use for each of the interfaces of the pairs of components.

5. The method of claim 4, wherein determining the maximum temporal compression ratio is based on the maximum speed of the clock used for each of the interfaces of the pairs of components.

6. The method of claim 1, further comprising repeating the determining of the timing estimates and the configuring of the gaskets steps to optimize a performance of the communications link.

7. The method of claim 1, further comprising determining, based on the determined timing estimates, whether or not to insert a repeater between pairs of components.

8. The method of claim 7, wherein the determination of whether or not to insert the repeater is based on at least one of a distance between pairs of components, wire length, capacitance, and resistance.

9. The method of claim 1, wherein configuring the gaskets is based on at least one of a physical boundary of a component, information on clock domains of a pair of components, location of pins of a component and a type of connection between a pair of components.

10. The method of claim 1, further comprising creating a new top-level infrastructure connecting the gaskets configured for the pairs of components.

11. The method of claim 10, further comprising creating source files for the new top level infrastructure connecting the gaskets configured for the pairs of components.

12. The method of claim 1, further comprising creating source files for the multiple components including the gaskets.

13. A system for designing communication interfaces between multiple components of an application specific integrated circuit (ASIC) chip, comprising:
a processor;
a computer readable medium coupled to the processor, the computer readable medium comprising instructions for causing the processor to:
identify interfaces and communication protocols used between pairs of components of the multiple components of the ASIC chip;
model a double nature arc abstraction of the identified interfaces of the multiple components, the double nature arc abstraction comprising a mixture of sequential and combinatorial timing arcs;
determine timing estimates between the pairs of components of the multiple components of the ASIC chip using the modeled double nature arc abstraction of the identified interfaces of the multiple components; and
based on the identified communication protocols and the determined timing estimates between the pairs of components of the multiple components of the ASIC chip, configure gaskets to insert into the interfaces of the multiple components of the ASIC chip, the gaskets configured to provide control of timing requirements of a communications link between the pairs of components of the multiple components of the ASIC chip,
wherein the designed communication interfaces are usable in fabrication of the ASIC chip.

14. The system of claim 13, wherein the interfaces of the multiple components comprise sequential and combinational arcs.

15. The system of claim 13, wherein the communications link utilizes a communication protocol method comprising:
using delay insensitive (DI) codes to encode information to be communicated between the pairs of components of the multiple components of the ASIC chip,
using quasi-delay-insensitive-logic to communicate the encoded information between the pairs of components of the multiple components of the ASIC chip,
using temporal compression between the pairs of components of the multiple components of the ASIC chip, and
using signals to indicate availability and readiness of information to be communicated between the pairs of components of the multiple components of the ASIC chip.

16. The system of claim 13, wherein the instructions further cause the processor to determine the timing estimates between the pairs of components of the multiple components of the ASIC chip by:
determining a maximum speed of a clock used for each of the interfaces of the pairs of components; and
determining a maximum temporal compression ratio to use for each of the interfaces of the pairs of components.

17. The system of claim 13, wherein the instructions further cause the processor to repeat the determining of the timing estimates and the configuring of the gaskets to optimize a performance of the communications link.

18. The system of claim 13, wherein the instructions further cause the processor to determine, based on the determined timing estimates, whether or not to insert a repeater between pairs of components.

19. The system of claim 13, wherein the instructions further cause the processor to configure the gaskets based on at least one of a physical boundary of a component, information on clock domains of a pair of components, location of pins of a component and a type of connection between a pair of components.

20. The system of claim 13, wherein the instructions further cause the processor to create a new top-level infrastructure connecting the gaskets configured for the pairs of components.

* * * * *